United States Patent
Watanabe et al.

(10) Patent No.: US 7,292,925 B1
(45) Date of Patent: Nov. 6, 2007

(54) ACCELERATION ESTIMATION DEVICE AND VEHICLE

(75) Inventors: Hiroto Watanabe, Shizuoka (JP); Yoshinobu Nishiike, deceased, late of Shizuoka (JP); by Yoshitaka Nishiike, legal representative, Kyoto (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/682,017

(22) Filed: Mar. 5, 2007

(30) Foreign Application Priority Data

Mar. 8, 2006 (JP) .............................. 2006-062979

(51) Int. Cl.
G06G 7/00 (2006.01)
(52) U.S. Cl. .......................................... 701/70; 701/91
(58) Field of Classification Search .................... 701/1, 701/36, 70, 71, 72, 75, 76, 79, 80, 89, 91, 701/82
See application file for complete search history.

(56) References Cited

U.S. PATENT DOCUMENTS

| | | | |
|---|---|---|---|
| 5,411,325 A | 5/1995 | Tanaka et al. | |
| 5,566,094 A | 10/1996 | Kojima et al. | |
| 5,608,631 A | 3/1997 | Tsutsumi et al. | |
| 6,192,305 B1 | 2/2001 | Schiffmann | |
| 7,103,460 B1 * | 9/2006 | Breed | 701/29 |
| 7,158,866 B2 * | 1/2007 | Gustafsson et al. | 701/1 |

FOREIGN PATENT DOCUMENTS

| | | |
|---|---|---|
| DE | 19844911 A1 | 4/2000 |
| JP | 2-19771 A | 1/1990 |
| JP | 5-97085 A | 4/1993 |
| JP | 6-1223 A | 1/1994 |
| JP | 6-11514 A | 1/1994 |
| JP | 6-107142 A | 4/1994 |
| JP | 6-270784 A | 9/1994 |
| JP | 06-270785 A | 9/1994 |
| JP | 7-228114 A | 8/1995 |

(Continued)

OTHER PUBLICATIONS

Hiroto Watanabe et al.; "Acceleration Estimation Device and Vehicle"; filed Mar. 5, 2007.

(Continued)

*Primary Examiner*—Richard M. Camby
(74) *Attorney, Agent, or Firm*—Keating & Bennett, LLP

(57) ABSTRACT

In an acceleration estimation device for estimating acceleration of a vehicle, a Karman filter for a constant speed estimates x-direction acceleration offset and z-direction acceleration offset when a motorcycle is stopped and is traveling at constant speed. An offset storage stores an x-direction acceleration offset estimated value and a z-direction acceleration offset estimated value. An offset corrector corrects an x-direction acceleration and a z-direction acceleration on the basis of the x-direction acceleration offset estimated value and the z-direction acceleration offset estimated value when the motorcycle is accelerated and decelerated. A Karman filter for acceleration/deceleration estimates the pitch angle of a vehicle body when the motorcycle is accelerated and decelerated. An acceleration corrector obtains an X-direction acceleration and a Z-direction acceleration on the basis of the estimated pitch angle. A vehicle speed operation unit integrates over time the X-direction acceleration to calculate an X-direction speed.

7 Claims, 11 Drawing Sheets

FOREIGN PATENT DOCUMENTS

| | | |
|---|---|---|
| JP | 8-268257 A | 10/1996 |
| JP | 10-104259 A | 4/1998 |
| JP | 10-175537 A | 6/1998 |
| JP | 2000-513824 A | 10/2000 |
| JP | 2001-74772 A | 3/2001 |
| JP | 2002-318274 A | 10/2002 |
| JP | 2003-4758 A | 1/2003 |
| JP | 2004-150973 A | 5/2004 |
| JP | 2005-145338 A | 6/2005 |
| JP | 2006-47146 A | 2/2006 |
| WO | 0201151 A1 | 1/2002 |

OTHER PUBLICATIONS

Official communication issued in the counterpart European Application No. 07004454.0, mailed on Aug. 7, 2007.

* cited by examiner

ACCELERATION ESTIMATION DEVICE AND VEHICLE

BACKGROUND OF THE INVENTION

1. Field of the Invention

The present invention relates to an acceleration estimation device that estimates vehicle accelerations, and a vehicle including the same.

2. Description of the Related Art

The traveling speeds of vehicles can be calculated on the basis of the rotational speeds of its wheels. When the vehicle is rapidly accelerated, however, the wheels may be rotated while sliding against a road surface. When the vehicle is rapidly decelerated (braked), the wheels may be caused to slide against the road surface. In such a case, the speed of the vehicle that can be calculated from the rotational speed of the wheels does not coincide with the actual traveling speed of the vehicle.

Therefore, the acceleration of the vehicle is detected using an acceleration sensor, and the detected acceleration is integrated to calculate the speed of the vehicle.

The acceleration sensor outputs the acceleration as a voltage. Generally, offset exists in the acceleration sensor. Here, the offset in the acceleration sensor refers to a value obtained by expressing a difference between a nominal value of the output voltage of the acceleration sensor at an acceleration of 0 m/s$^2$ and a value of the actual output voltage of the acceleration sensor in terms of units of (m/s$^2$) of acceleration.

The offset varies for each acceleration sensor. JP 10-104259 A discloses a vehicle longitudinal acceleration estimating device that removes an unnecessary component of an acceleration sensor for detecting a longitudinal acceleration to calculate an estimated value of the longitudinal acceleration.

In the longitudinal acceleration estimating device disclosed in JP 10-104259 A, the change in an output voltage of the acceleration sensor is frequency-analyzed and is classified into changes due to DC offset, changes due to temperature drift, changes due to road conditions, changes due to acceleration/deceleration of a vehicle, and changes due to pitching of a vehicle body. A Karman filter is used to extract only a variation component having a higher frequency than a particular frequency from a detected value of the longitudinal acceleration by the acceleration sensor.

This causes a variation component due to DC offset and a variation component due to temperature drift respectively having low frequencies to be removed from the detected value of the longitudinal acceleration. As a result, the estimated value of the longitudinal acceleration is not affected by changes with time and changes in temperature.

When the vehicle is rapidly accelerated or decelerated, however, the vehicle body is inclined by pitching. That is, the front of the vehicle body rises at the time of rapid acceleration, and lowers at the time of rapid deceleration. Even when the vehicle is traveling at constant speed, the vehicle body is slightly pitched. This causes a component of a gravitational force to be exerted on the acceleration sensor for detecting the longitudinal acceleration. As a result, the detected value in the acceleration sensor includes an offset and is affected by the component of the gravitational force.

In the longitudinal acceleration estimating device disclosed in JP 10-104259A, an unnecessary component in a particular frequency band can be removed from the detected value in the acceleration sensor. However, the effect of the component of force of gravity due to pitching in a frequency band other than the particular frequency band cannot be removed. Therefore, the longitudinal acceleration of the vehicle cannot be accurately estimated.

SUMMARY OF THE INVENTION

In order to overcome the problems described above, preferred embodiments of the present invention provide an acceleration estimation device that can estimate vehicle accelerations with high accuracy and a vehicle including the same.

According to a preferred embodiment of the present invention, an acceleration estimation device that estimates accelerations of a vehicle includes a first acceleration sensor that is provided in the vehicle and detects the acceleration in the forward-and-backward direction of the vehicle; a second acceleration sensor that is provided in the vehicle and detects the acceleration in the up-and-down direction of the vehicle; a wheel speed detector that detects a wheel speed of the vehicle; an offset estimator that estimates offset in the first acceleration sensor and offset in the second acceleration sensor using the relationship among a detected value in the first acceleration sensor, a detected value in the second acceleration sensor, and a detected value in the wheel speed detector when the vehicle is at a substantially constant speed; and a corrector that corrects the detected value in the first acceleration sensor and the detected value in the second acceleration sensor on the basis of an estimated value of the offset in the first acceleration sensor and an estimated value of the offset in the second acceleration sensor that are obtained by the offset estimator when the vehicle is accelerated or decelerated.

Here, the time when the vehicle is at a substantially constant speed refers to the time when the vehicle is stopped and the time when the rate of change in the traveling speed of the vehicle is not more than a predetermined threshold value. The threshold value is in a range of about −0.2 m/s$^2$ to about +0.2 m/s$^2$, for example.

In the acceleration estimation device, the first acceleration sensor and the second acceleration sensor are provided in the vehicle. The first acceleration sensor detects the acceleration in the forward-and-backward direction of the vehicle, and the second acceleration sensor detects the acceleration in the up-and-down direction of the vehicle. Further, the wheel speed detector detects the wheel speed of the vehicle.

The offset estimator estimates the offset in the first acceleration sensor and the offset in the second acceleration sensor using the relationship among the detected value in the first acceleration sensor, the detected value in the second acceleration sensor, and the detected value in the wheel speed detector when the vehicle is at a substantially constant speed. Even when a detected value of the acceleration in the forward-and-backward direction and a detected value of the acceleration in the up-and-down direction are affected by gravity due to pitching, the accelerations are detected using the previously estimated offset when the vehicle is at a constant speed. This allows the acceleration in a traveling direction to be accurately detected.

The offset in the first acceleration sensor and the offset in the second acceleration sensor preferably are not changed in a short time period.

When the vehicle is accelerated or decelerated, the corrector corrects the detected value in the first acceleration sensor and the detected value in the second acceleration sensor on the basis of the estimated value of the offset in the first acceleration sensor and the estimated value of the offset in the second acceleration sensor that are obtained when the vehicle is at a substantially constant speed. This allows the acceleration in the forward-and-backward direction and the acceleration in the up-and-down direction of the vehicle to be detected with high accuracy.

The offset estimator may include a first Karman filter that estimates the offset in the first acceleration sensor and the offset in the second acceleration sensor based on the relationship among the acceleration in a traveling direction of the vehicle that is perpendicular or substantially perpendicular to a direction of gravity; the acceleration in a vertical direction that is parallel or substantially parallel to the direction of gravity; the detected value in the first acceleration sensor; the detected value in the second acceleration sensor; a speed in the traveling direction; a speed in the vertical direction; the speed of the vehicle obtained from the detected value in the wheel speed detector; and the pitch angle of the vehicle.

In this case, the first Karman filter estimates the offset in the first acceleration sensor and the offset in the second acceleration sensor. Even when the detected value of the acceleration in the forward-and-backward direction and the detected value of the acceleration in the up-and-down direction are affected by gravity due to pitching having an arbitrary frequency, it is possible to more accurately estimate the offset in the first acceleration sensor and the offset in the second acceleration sensor.

An observed disturbance applied to the first acceleration sensor and the second acceleration sensor is removed in the first Karman filter. This prevents a control system controlled on the basis of the acceleration in the forward-and-backward direction and the acceleration in the up-and-down direction of the vehicle from being unstable due to the observed disturbance.

The acceleration estimation device may further include a pitch angle estimator that estimates the pitch angle of the vehicle when the vehicle is accelerated or decelerated, and an acceleration calculator that calculates the acceleration in the traveling direction of the vehicle that is perpendicular or substantially perpendicular to the direction of gravity, and the acceleration in the vertical direction that is parallel or substantially parallel to the direction of gravity on the basis of the detected value in the first acceleration sensor and the detected value in the second acceleration sensor that are corrected by the corrector and the pitch angle estimated by the pitch angle estimator.

In this case, the pitch angle estimator estimates the pitch angle of the vehicle, and the acceleration calculator calculates the acceleration in the traveling direction that is perpendicular or substantially perpendicular to the direction of gravity and the acceleration in the vertical direction that is parallel or substantially parallel to the direction of gravity on the basis of the detected value in the first acceleration sensor and the detected value in the second acceleration sensor that are corrected and the estimated pitch angle. This allows the acceleration in the traveling direction of the vehicle to be detected with high accuracy even when the vehicle is accelerated or decelerated.

The acceleration estimation device may further include a speed calculator that integrates a calculated value of the acceleration in the traveling direction obtained by the acceleration calculator to calculate a speed in the traveling direction. In this case, the speed in the traveling direction of the vehicle can be detected with high accuracy.

The pitch angle estimator may include a second Karman filter that estimates the pitch angle of the vehicle using the relationship among the detected value in the first acceleration sensor and the detected value in the second acceleration sensor that are corrected by the corrector, the acceleration in the traveling direction, the acceleration in the vertical direction, and the pitch angle of the vehicle.

In this case, the second Karman filter estimates the pitch angle of the vehicle. Even when the detected value of the acceleration in the forward-and-backward direction and the detected value of the acceleration in the up-and-down direction are affected by gravity due to pitching having an arbitrary frequency when the vehicle is accelerated or decelerated, it is possible to more accurately estimate the pitch angle of the vehicle.

The offset estimator may determine that the vehicle is in a substantially constant speed state when the rate of change in the wheel speed detected by the wheel speed detector is not more than a predetermined threshold value.

In this case, it is determined that the vehicle is in the substantially constant speed state when the rate of change in the wheel speed is not more than the threshold value. The offset estimator estimates the offset in the first acceleration sensor and the offset in the second acceleration sensor. Even when the speed of the vehicle is slightly changed, the offset in the first acceleration sensor and the offset in the second acceleration sensor can be detected with high accuracy.

According to another preferred embodiment of the present invention, a vehicle includes a vehicle body, a wheel provided on the vehicle body, an acceleration estimation device that is provided on the vehicle body, and a controller, wherein the acceleration estimation device includes a first acceleration sensor that is provided on the vehicle and detects the acceleration in the forward-and-backward direction of the vehicle, a second acceleration sensor that is provided on the vehicle and detects the acceleration in the up-and-down direction of the vehicle, a wheel speed detector that detects a wheel speed of the vehicle, an offset estimator that estimates offset in the first acceleration sensor and offset in the second acceleration sensor using the relationship among a detected value in the first acceleration sensor, a detected value in the second acceleration sensor, and a detected value in the wheel speed detector when the vehicle is at a substantially constant speed, and a corrector that corrects the detected value in the first acceleration sensor and the detected value in the second acceleration sensor on the basis of an estimated value of the offset in the first acceleration sensor and an estimated value of the offset in the second acceleration sensor that are obtained by the offset estimator when the vehicle is accelerated or decelerated, and the controller controls the rotation of the wheel on the basis of at least one of the detected value in the first acceleration sensor and the detected value in the second acceleration sensor that are corrected by the acceleration estimation device.

When the vehicle is at a substantially constant speed, the acceleration estimation device estimates the offset in the first acceleration sensor and the offset in the second acceleration sensor. When the vehicle is accelerated or decelerated, the acceleration estimation device corrects the detected value in the first acceleration sensor and the detected value in the second acceleration sensor on the basis of the estimated value of the offset in the first acceleration sensor and the estimated value of the offset in the second acceleration sensor that are obtained when the vehicle is at a substantially constant speed. This allows the acceleration in the forward-and-backward direction and the acceleration in the up-and-down direction of the vehicle to be detected with high accuracy.

The controller controls the rotation of the wheel on the basis of at least one of the detected value in the first acceleration sensor and the detected value in the second acceleration sensor that are corrected by the acceleration estimation device.

According to the preferred embodiments of the present invention, the offset estimator estimates the offset in the first acceleration sensor and the offset in the second acceleration sensor using the relationship among the detected value in the first acceleration sensor, the detected value in the second acceleration sensor, and the detected value in the wheel speed detector. Even when the detected value of the acceleration in the forward-and-backward direction and the detected value of the acceleration in the up-and-down direction are affected by gravity due to pitching, the acceleration is detected using the previously estimated offset when the vehicle is at a constant speed. This allows the acceleration in the traveling direction to be accurately detected.

When the vehicle is accelerated or decelerated, the corrector corrects the detected value in the first acceleration sensor and the detected value in the second acceleration sensor on the basis of the estimated value of the offset in the first acceleration sensor and the estimated value of the offset in the second acceleration sensor that are obtained when the vehicle is at a substantially constant speed. This allows the acceleration in the forward-and-backward direction and the acceleration in the up-and-down direction of the vehicle to be detected with high accuracy.

Other features, elements, steps, characteristics, and advantages of the present invention will become more apparent from the following description of preferred embodiments of the present invention with reference to the attached drawings.

DETAILED DESCRIPTION OF THE PREFERRED EMBODIMENTS

In the following preferred embodiments, description is made of an example in which an acceleration estimation device according to the present invention is applied to a motorcycle.

(1) Basic Idea of the Present Preferred Embodiment

First, the relationship of accelerations at the time of deceleration of a motorcycle comprising an acceleration detection device according to the present preferred embodiment will be described.

Figure 1:
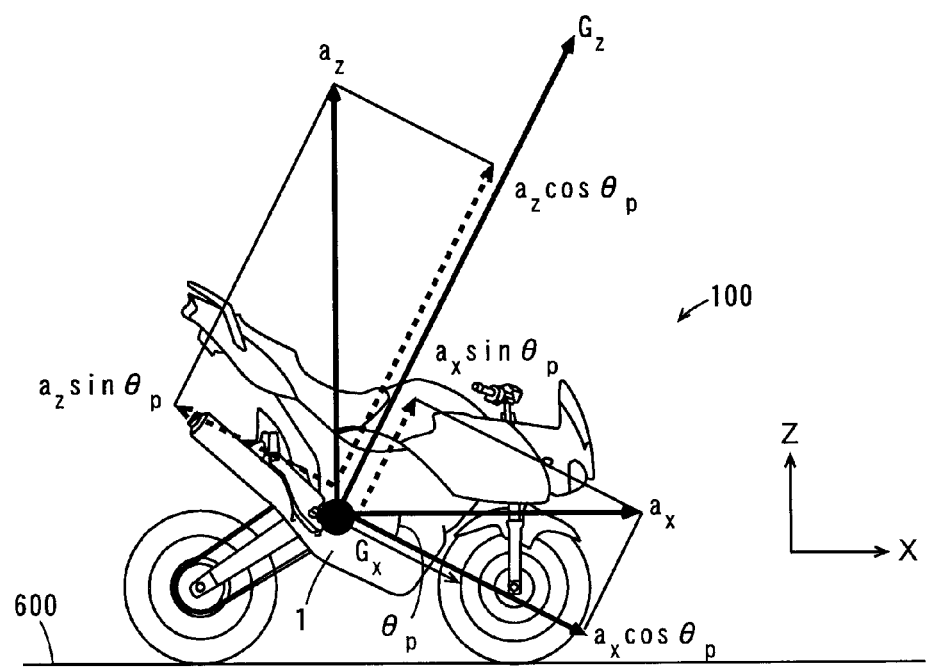
FIG. 1 is a diagram showing the relationship of accelerations received by an acceleration sensor at the time of deceleration.

FIG. 1 is a diagram showing the relationship of accelerations received by an acceleration sensor at the time of deceleration.

As shown in FIG. 1, when a motorcycle 100 is decelerated by a front-wheel brake, a front suspension contracts, and a rear suspension expands. Therefore, the motorcycle 100 is inclined forward in its traveling direction.

A coordinate system fixed to the ground below the motorcycle 100 is taken as a ground coordinate system, and a coordinate system fixed to the acceleration sensor attached to the motorcycle 100 is taken as a sensor coordinate system.

On the ground coordinate system, a traveling direction of the motorcycle 100 (a direction perpendicular or substantially perpendicular to gravity) on a horizontal ground surface 600 is defined as an X-direction, and a vertical direction (a direction of gravity) is defined as a Z-direction. Consequently, the X-direction and the Z-direction on the ground coordinate system are not changed irrespective of the posture of the motorcycle 100.

On the sensor coordinate system, a direction of the horizontal axis of the motorcycle 100 (a forward-and-backward direction of a vehicle body 1) in a case where the motorcycle 100 is in a horizontal state is defined as an x-direction, and a direction perpendicular or substantially perpendicular to the horizontal axis of the motorcycle 100 (an up-and-down direction of the vehicle body 1) is defined as a z-direction. Consequently, the x-direction and the z-direction on the sensor coordinate system are inclined to the X-direction and the Z-direction on the ground coordinate system by the posture of the motorcycle 100.

Hereinafter, the X-direction on the ground coordinate system is merely referred to as an X-direction or a traveling direction, and the Z-direction on the ground coordinate system is referred to as a Z-direction or a vertical direction.

From FIG. 1, an acceleration $G_x$ in the x-direction and an acceleration $G_z$ in the z-direction on the sensor coordinate system are respectively expressed by the following equations using an acceleration $a_x$ in the X-direction and an acceleration $a_z$ in the Z-direction on the ground coordinate system:

$$G_x = a_x \cos \theta_p - a_z \sin \theta_p \quad (1)$$

$$G_z = a_x \sin \theta_p + a_z \cos \theta_p \quad (2)$$

In the foregoing equations (1) and (2), $\theta_P$ denotes the pitch angle of the vehicle body 1.

The motorcycle 100 in the present preferred embodiment is provided with an x-direction acceleration sensor for detecting the acceleration $G_x$ in the x-direction of the vehicle body 1 and a z-direction acceleration sensor for detecting the acceleration $G_z$ in the z-direction.

The acceleration $a_x$ in the X-direction and the acceleration $a_z$ in the Z-direction on the ground coordinate system of the motorcycle 100 can be measured by detecting the acceleration $G_x$ in the x-direction using the x-direction acceleration sensor, detecting the acceleration $G_z$ in the z-direction using the z-direction acceleration sensor, and determining the pitch angle $\theta_P$.

Generally, offset exists in the acceleration sensor. Here, the offset in the acceleration sensor refers to a value obtained by expressing a difference between a nominal value of an output voltage of the acceleration sensor at an acceleration of 0 m/s² and a value of an actual output voltage of the acceleration sensor in terms of unit of acceleration (m/s²).

Hereinafter, offset in the x-direction acceleration sensor is referred to as x-direction acceleration offset, and offset in the z-direction acceleration sensor is referred to as z-direction acceleration offset.

In the present preferred embodiment, the x-direction acceleration offset and the z-direction acceleration offset are estimated using an extended Karman filter, described later, when the motorcycle 100 is at a substantially constant speed.

Here, the time when the motorcycle 100 is at a substantially constant speed includes the time when the motorcycle 100 is stopped and the time when the rate of change in the traveling speed of the motorcycle 100 is not more than a predetermined threshold value. In the following description, the time when the motorcycle 100 is traveling at a constant speed and the time when the rate of change in the traveling speed is not more than a threshold value are merely referred to as the time when the motorcycle 100 is traveling at a constant speed.

When the motorcycle 100 is accelerated and decelerated, the acceleration $G_X$ in the x-direction and the acceleration $G_z$ in the z-direction are corrected on the basis of respective estimated values of the x-direction acceleration offset and the z-direction acceleration offset, and the pitch angle $\theta_P$ of the vehicle body 1 is estimated on the basis of respective corrected values of the acceleration $G_x$ in the x-direction and the acceleration $G_z$ in the z-direction. Further, the acceleration in the X-direction and the acceleration in the Z-direction of the motorcycle 100 are calculated using an estimated value of the pitch angle $\theta_P$. Further, the acceleration in the X-direction is integrated to calculate the speed in the X-direction of the motorcycle 100.

(2) Configuration of the Motorcycle

Figure 2:
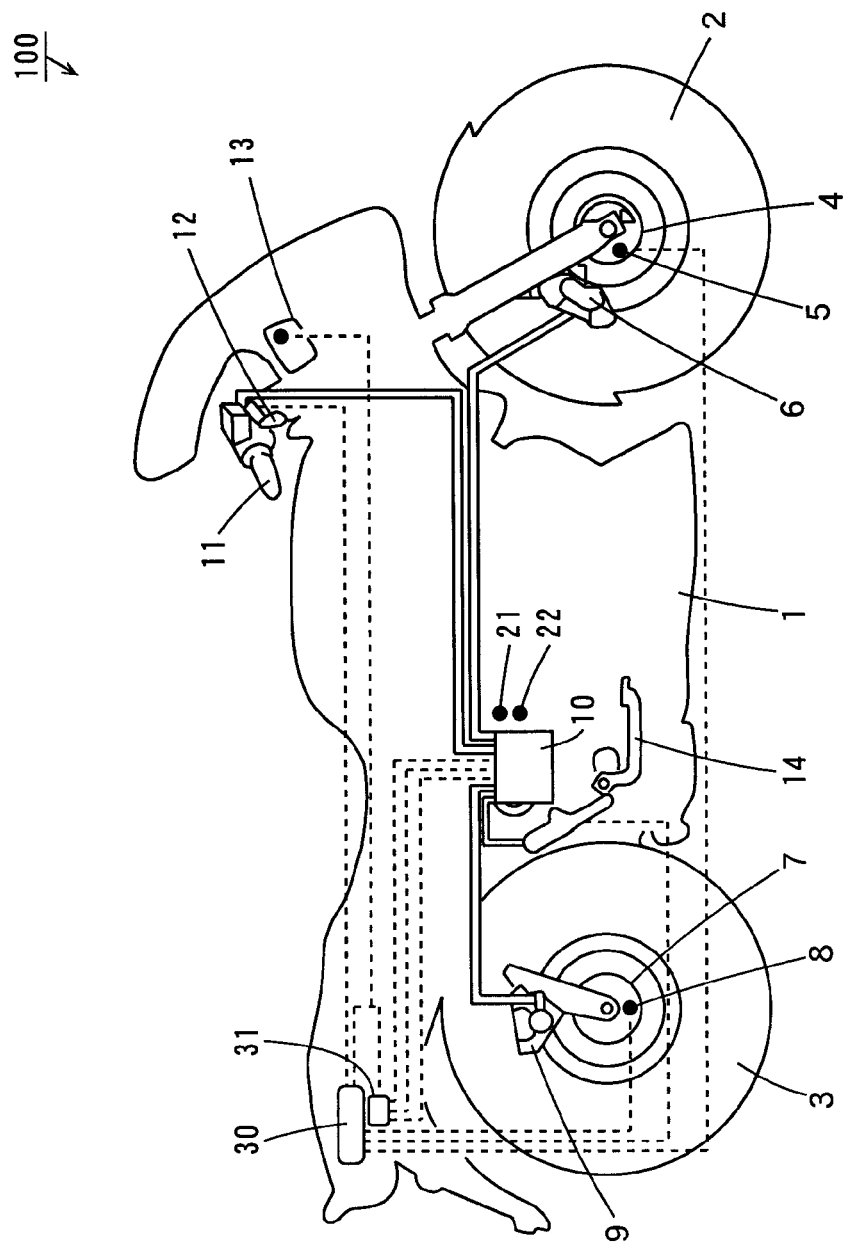
FIG. 2 is a diagram showing the schematic configuration of the overall motorcycle according to a preferred embodiment of the present invention.

FIG. 2 is a diagram showing the schematic configuration of the motorcycle 100 according to the present preferred embodiment. An ABS (Anti-Lock Brake System), described later, is preferably included in the motorcycle 100.

As shown in FIG. 2, a front wheel 2 is attached to the front of the vehicle body 1 of the motorcycle 100, and a rear wheel 3 is attached to the rear of the vehicle body 1.

A sensor rotor 4 that rotates with the front wheel 2 is provided at the center of the front wheel 2. A front-wheel speed sensor 5 for detecting the rotational speed of the front wheel 2 is attached to the sensor rotor 4. Further, there is provided a front brake caliper 6 that is brought into contact with a brake disk of the front wheel 2 for braking the front wheel 2.

A sensor rotor 7 that rotates with the rear wheel 3 is provided at the center of the rear wheel 3. A rear-wheel speed sensor 8 for detecting the rotational speed of the rear wheel 3 is attached to the sensor rotor 7. Further, there is provided a rear brake caliper 9 that is brought into contact with a brake disk of the rear wheel 3 for braking the rear wheel 3.

A handle 11 is arranged so as to be swingable right and left at the top on the front side of the vehicle body 1. The handle 11 is provided with a front brake lever 12 and a warning lamp 13.

A hydraulic unit 10 is provided at the center of the vehicle body 1. A rear brake pedal 14 is provided below the center of the vehicle body 1. An x-direction acceleration sensor 21 and a z-direction acceleration sensor 22 are attached to a position at the center of gravity of the vehicle body 1. As the x-direction acceleration sensor 21 and the z-direction acceleration sensor 22, a two-axis acceleration sensor or a three-axis acceleration sensor for use in detection of inclination, an impact of air bags, a drop of hard disks, etc. can be used.

An electronic control unit (hereinafter abbreviated as ECU) 30 and a fail-safe relay 31 are provided at the rear of the vehicle body 1.

(3) Configuration of the ABS

Figure 3:
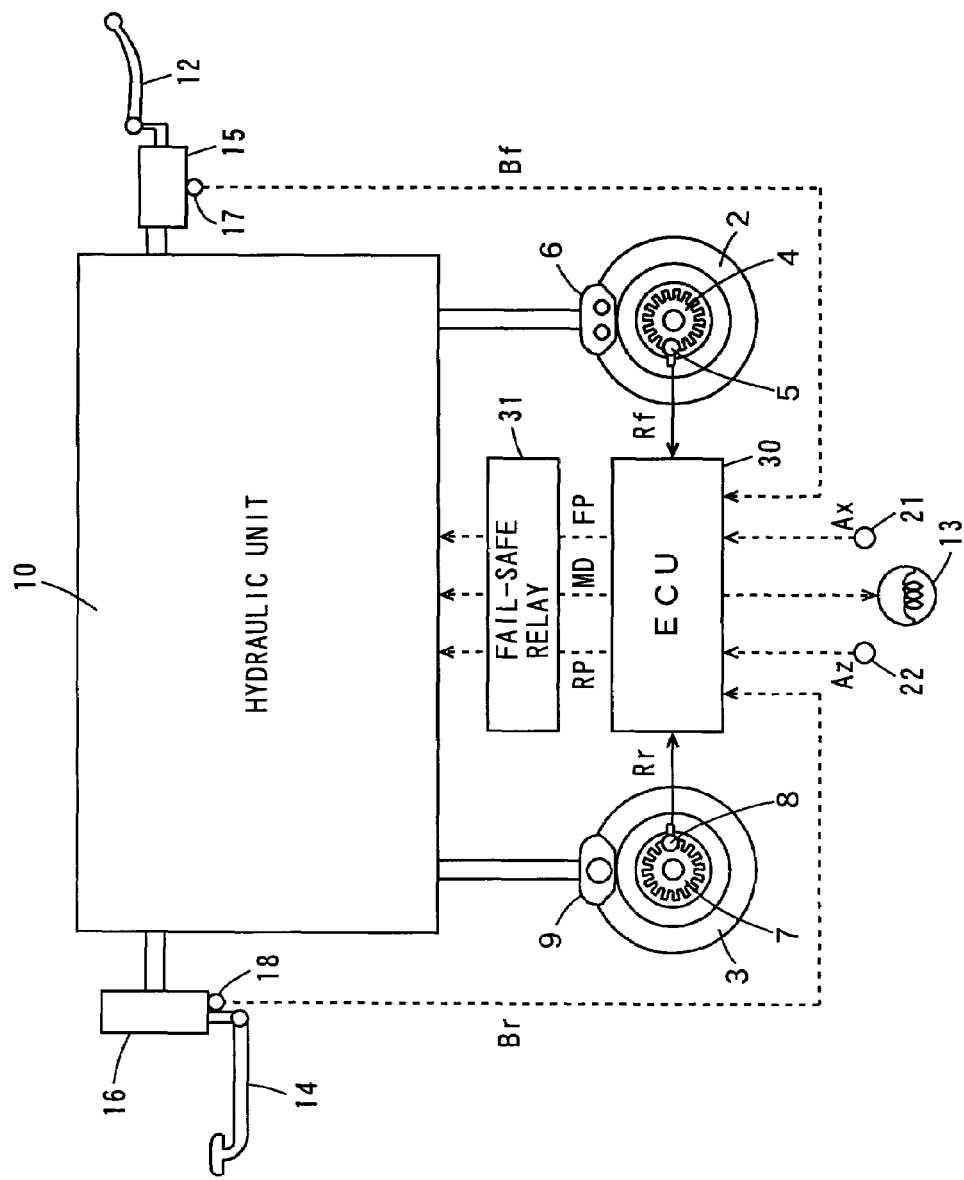
FIG. 3 is a schematic view showing a hydraulic system and an electrical system of an ABS.

FIG. 3 is a schematic view showing a hydraulic system and an electrical system of the ABS.

As shown in FIG. 3, a master cylinder 15 is connected to the front brake lever 12, and the master cylinder 15 is connected to the hydraulic unit 10. The master cylinder 15 is provided with a brake switch 17. A master cylinder 16 is connected to the rear brake pedal 14, and the master cylinder 16 is connected to the hydraulic unit 10. The master cylinder 16 is provided with a brake switch 18.

When a driver operates the front brake lever 12, the master cylinder 15 raises the pressure of hydraulic fluid supplied to the front brake caliper 6 from the hydraulic unit 10. This causes the front brake caliper 6 to be driven to brake the front wheel 2. At this time, the brake switch 17 is turned on so that a front-wheel brake signal Bf is fed to the ECU 30.

When the driver operates the rear brake lever 14, the master cylinder 16 raises the pressure of hydraulic fluid supplied to the rear brake caliper 9 from the hydraulic unit 10. This causes the rear brake caliper 9 to be driven to brake the rear wheel 3. At this time, the brake switch 18 is turned on so that a rear-wheel brake signal Br is fed to the ECU 30.

A front-wheel speed signal Rf representing the rotational speed of the front wheel 2 is fed to the ECU 30 from the front-wheel speed sensor 5 provided in the sensor rotor 4 in the front wheel 2. A rear-wheel speed signal Rr representing the rotational speed of the rear wheel 3 is fed to the ECU 30 from the rear-wheel speed sensor 8 provided in the sensor rotor 7 in the rear wheel 3. Hereinafter, the rotational speed of the front wheel 2 is referred to as a front wheel speed, and the rotational speed of the rear wheel 3 is referred to as a rear wheel speed.

An x-direction acceleration signal Ax representing x-direction acceleration is fed to the ECU 30 from the x-direction acceleration sensor 21. A z-direction acceleration signal Az representing z-direction acceleration is fed to the ECU 30 from the z-direction acceleration sensor 22.

The ECU 30 outputs a motor driving signal MD for driving a motor for a hydraulic pump within the hydraulic unit 10 to the hydraulic unit 10 through the fail-safe relay 31 in response to the front-wheel brake signal Bf or the rear-wheel brake signal Br.

The ECU 30 outputs a reduced pressure signal FP for the front wheels and a reduced pressure signal RP for the rear wheels to the hydraulic unit 10 through the fail-safe relay 31 on the basis of the front-wheel speed signal Rf, the rear-wheel speed signal Rr, the x-direction acceleration signal Ax, and the z-direction acceleration signal Az.

The hydraulic unit 10 reduces the pressure of hydraulic fluid supplied to the front brake caliper 6 in response to the reduced pressure signal FP. This causes the braking of the front wheel 2 by the front brake caliper 6 to be released. Further, the motorcycle 100 reduces the pressure of hydraulic fluid supplied to the rear brake caliper 9 in response to the reduced pressure signal RP. This causes the braking of the rear wheel 3 by the rear brake caliper 9 to be released.

The fail-safe relay 31 switches the operation of the ABS in the hydraulic unit 10 into a normal braking operation when the ABS fails. When the ABS fails, the warning lamp 13 lights up.

(4) Configuration of the Vehicle Speed Estimator

Figure 4:
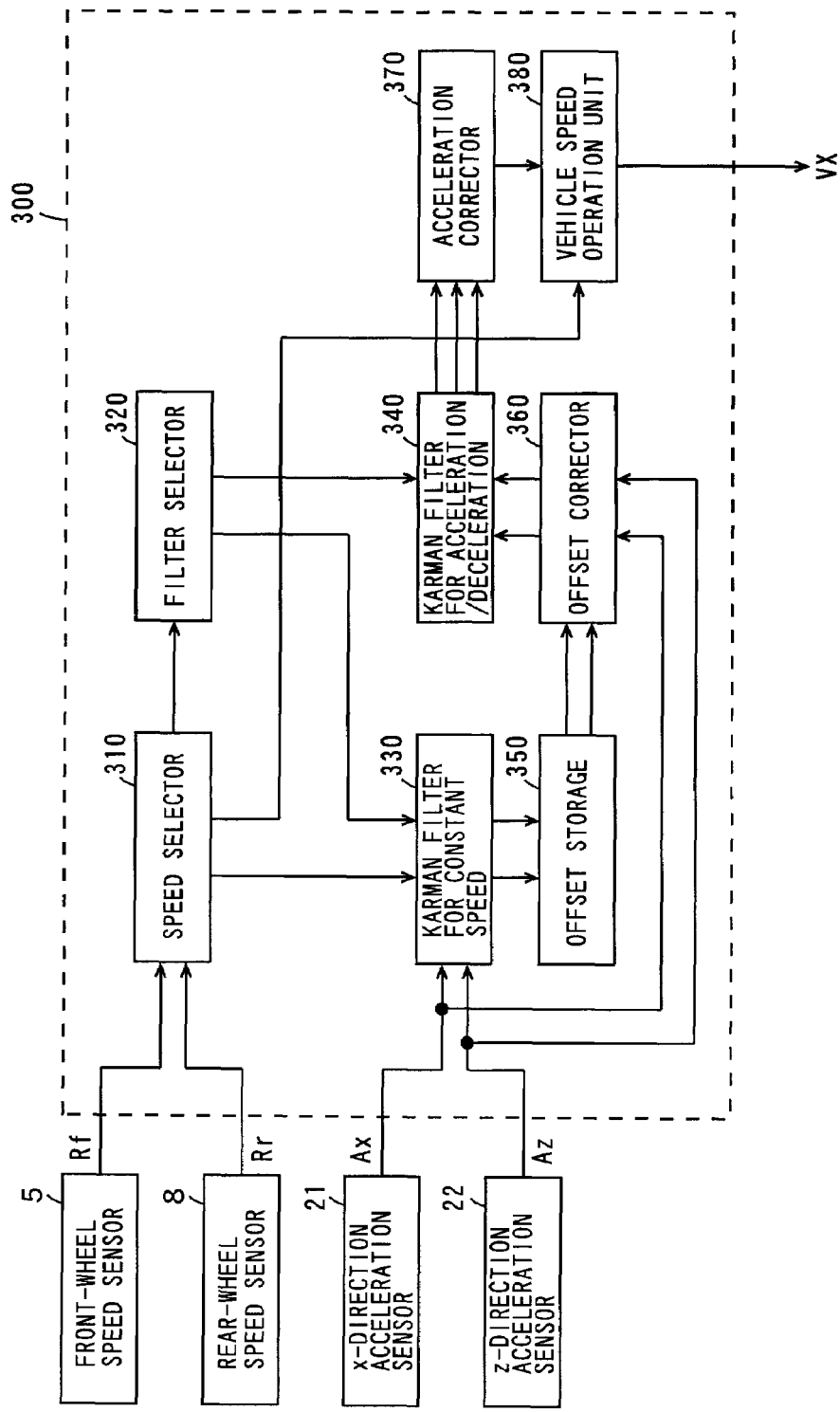
FIG. 4 is a block diagram showing the configuration of a vehicle speed estimator.

FIG. 4 is a block diagram showing the configuration of a vehicle speed estimator.

The acceleration estimation device according to the present preferred embodiment is preferably used for a vehicle speed estimator 300 shown in FIG. 4. The vehicle speed estimator 300 includes a speed selector 310, a filter selector 320, a Karman filter 330 for constant speed, a Karman filter 340 for acceleration/deceleration, an offset storage 350, an offset corrector 360, an acceleration corrector 370, and a vehicle speed operation unit 380. Each of the constituent elements within the vehicle speed estimator 300 is preferably provided in the ECU 30 shown in FIGS. 2 and 3 with an associated program function.

The front-wheel speed signal Rf and the rear-wheel speed signal Rr are respectively fed to the speed selector 310 from the front-wheel speed sensor 5 and the rear-wheel speed sensor 8, and the x-direction acceleration signal Ax is fed thereto from the x-direction acceleration sensor 21.

The speed selector 310 selects the front-wheel speed signal Rf as a vehicle speed when the motorcycle 100 is at a substantially constant speed (is stopped and is traveling at constant speed). When the motorcycle 100 is accelerated and decelerated, the front wheel speed and the rear wheel speed are compared with each other on the basis of the front-wheel speed signal Rf and the rear-wheel speed signal Rr, to select the smaller one of the front wheel speed and the rear wheel speed as a vehicle speed at the time of the acceleration, while selecting the larger one of the front wheel speed and the rear wheel speed as a vehicle speed at the time of the deceleration. Note that a substantially constant speed state or an accelerated/decelerated state is determined on the basis of the rate of change in the vehicle speed selected at the time of the determination. The vehicle speed selected by the speed selector 310 is outputted to the vehicle speed operation unit 380.

The vehicle speed is provided to the Karman filter 330 from the speed selector 310, and the x-direction acceleration signal Ax and the z-direction acceleration signal Az are respectively fed from the x-direction acceleration sensor 21 and the z-direction acceleration sensor 22. The Karman filter 330 estimates the x-direction acceleration offset and the z-direction acceleration offset in a method, described later, when the motorcycle 100 is at a substantially constant speed (is stopped and is traveling at a constant speed), to obtain an x-direction acceleration offset estimated value and a z-direction acceleration offset estimated value.

The offset storage 350 stores the x-direction acceleration offset estimated value and the z-direction acceleration offset estimated value that are obtained by the Karman filter 330.

The x-direction acceleration signal Ax and the z-direction acceleration signal Az are respectively fed to the offset corrector 360 from the x-direction acceleration sensor 21 and the z-direction acceleration sensor 22, and the x-direction acceleration offset estimated value and the z-direction acceleration offset estimated value are fed thereto from the offset storage 350. The offset corrector 360 corrects the x-direction acceleration and the z-direction acceleration on the basis of the x-direction acceleration offset estimated value, the z-direction acceleration offset estimated value, the x-direction acceleration signal Ax, and the z-direction acceleration signal Az when the motorcycle 100 is accelerated and decelerated.

The Karman filter 340 estimates the pitch angle of the vehicle body 1 on the basis of the wheel speed given from the speed selector 310 and the x-direction acceleration and the z-direction acceleration that are corrected by the offset corrector 360 when the motorcycle 100 is accelerated and decelerated, to obtain a pitch angle estimated value.

Information representing the results of the determination of the substantially constant speed state or the accelerated/decelerated state is given to the filter selector 320 from the speed selector 310. Based on the information representing the results of the determination, the filter selector 320 operates the Karman filter 330 in the substantially constant speed state or operates the Karman filter 340 as well as the vehicle speed operation unit 380 in the accelerated/decelerated state.

The acceleration corrector 370 corrects the x-direction acceleration and the z-direction acceleration that are corrected by the offset corrector 360 on the basis of the pitch angle estimated value obtained by the Karman filter 340 to obtain an X-direction acceleration and a Z-direction acceleration.

The vehicle speed operation unit 380 integrates overtime the X-direction acceleration obtained by the acceleration corrector 370 using the vehicle speed obtained from the speed selector 310 as an initial value immediately before the operation to calculate an X-direction speed (vehicle speed) and output a vehicle speed signal VX representing the vehicle speed.

(5) Operation of the Vehicle Speed Estimator

Figure 5:
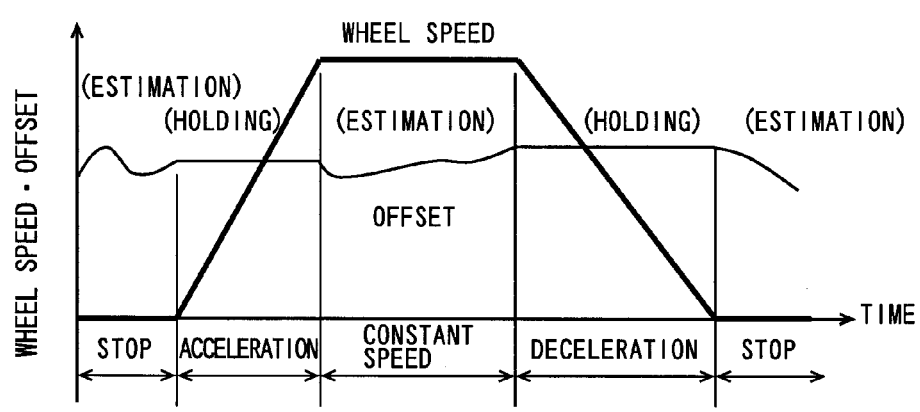
FIG. 5 is a diagram for explaining the relationship between an operation of estimating x-direction acceleration offset and z-direction acceleration offset in the vehicle speed estimator and the change in wheel speed.

FIG. 5 is a diagram for explaining the relationship between an operation of estimating the x-direction acceleration offset and the z-direction acceleration offset in the vehicle speed estimator 300 and the change in the wheel speed. In FIG. 5, the vertical axis represents offset and wheel speed, and the horizontal axis represents time. A thick solid line indicates the change in the wheel speed, and a thin solid line indicates the respective changes in the x-direction acceleration offset estimated value and the z-direction acceleration offset estimated value.

The operation of estimating the x-direction acceleration offset and the z-direction acceleration offset is performed in the Karman filter 330 for a constant speed when the motorcycle 100 is stopped and is traveling at a constant speed, while the x-direction acceleration offset estimated value and the z-direction acceleration offset estimated value are held when the motorcycle 100 is accelerated and decelerated.

Figure 6:
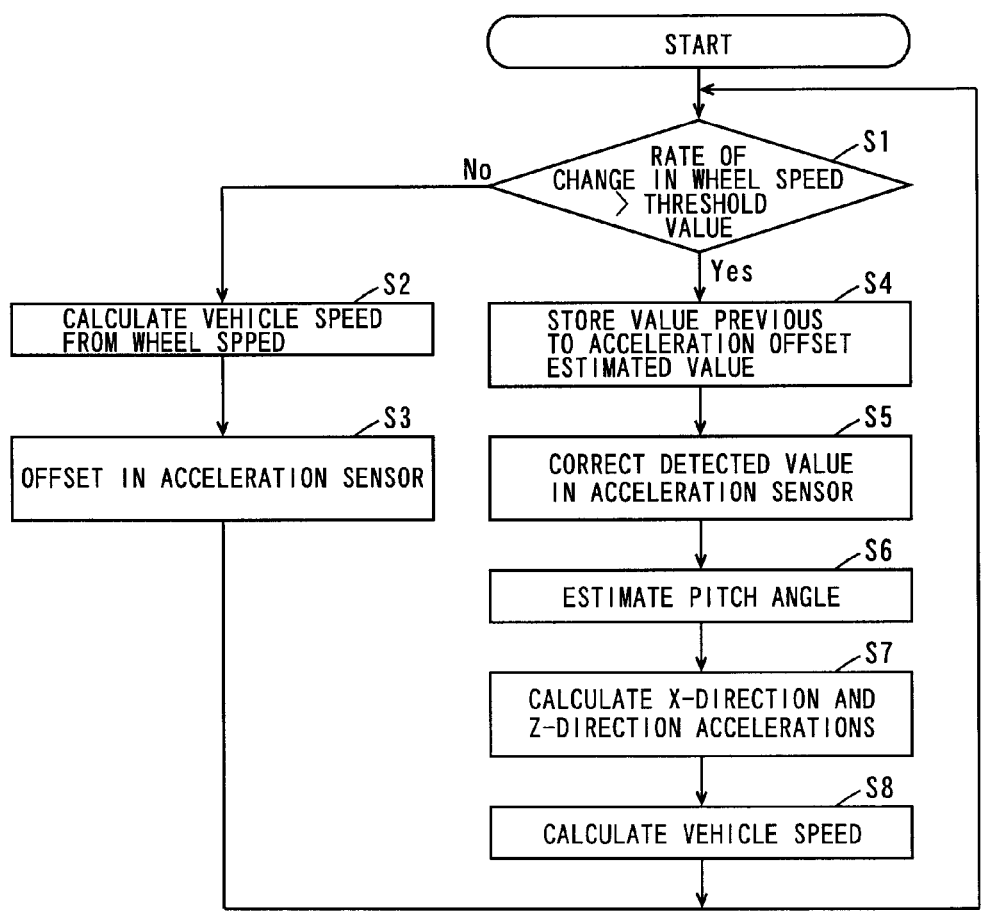
FIG. 6 is a flowchart showing the operations of the vehicle speed estimator.

FIG. 6 is a flow chart showing the operations of the vehicle speed estimator 300.

The filter selector 320 in the vehicle speed estimator 300 determines whether or not the rate of change in a wheel speed selected by the speed selector 310 is larger than a predetermined threshold value (step S1). Here, the threshold value is about −0.2 m/s$^2$ to about +0.2 m/s$^2$, for example.

When it is determined in the step S1 that the rate of change in the wheel speed is not more than the predetermined threshold value, the filter selector 320 considers that the motorcycle 100 is stopped or is traveling at a constant speed to calculate a vehicle speed from the wheel speed (step S2). Here, the vehicle speed corresponds to an X-direction speed observed value, described later.

The Karman filter 330 then respectively estimates offset in the x-direction acceleration sensor 21 (x-direction acceleration offset) and offset in the z-direction acceleration sensor 22 (z-direction acceleration offset) by a method, described later, to obtain an x-direction acceleration offset estimated value and a z-direction acceleration offset estimated value (step S3). In this case, a Z-direction speed observed value, described later, is taken as zero, for example. Thereafter, the procedure is returned to the step S1.

When it is determined in the step S1 that the rate of change in the wheel speed is more than the predetermined threshold value, the filter selector 320 considers that the motorcycle 100 is accelerated or decelerated, and the offset storage 350 stores previous respective values of the x-direction acceleration offset estimated value and the z-direction acceleration offset estimated value (values estimated in the step S3) (step S4).

The offset corrector 360 then respectively corrects a detected value in the x-direction acceleration sensor 21 and a detected value in the z-direction acceleration sensor 22 by a method, described later, on the basis of the x-direction acceleration offset estimated value and the z-direction acceleration offset estimated value that are stored in the offset storage 350 (step S5).

The Karman filter 340 for acceleration/deceleration then estimates the pitch angle of the vehicle body 1 by a method, described later, on the basis of the detected value in the x-direction acceleration sensor 21 and the detected value in the z-direction acceleration sensor 22 that are corrected by the offset corrector 360 to obtain a pitch angle estimated value (step S6).

The acceleration corrector 370 then corrects an x-direction acceleration and a z-direction acceleration by a method, described later, using the detected value in the x-direction acceleration sensor 21 and the detected value in the z-direction acceleration sensor 22 that are corrected by the offset corrector 360 and the pitch angle estimated value to calculate an X-direction acceleration and a Y-direction acceleration (step S7).

Furthermore, the vehicle speed operation unit 380 integrates over time the X-direction acceleration, to calculate a vehicle speed (step S8). Thereafter, the procedure is returned to the step S1.

(6) Configuration and Operation of the ABS Signal Processor

Figure 7:
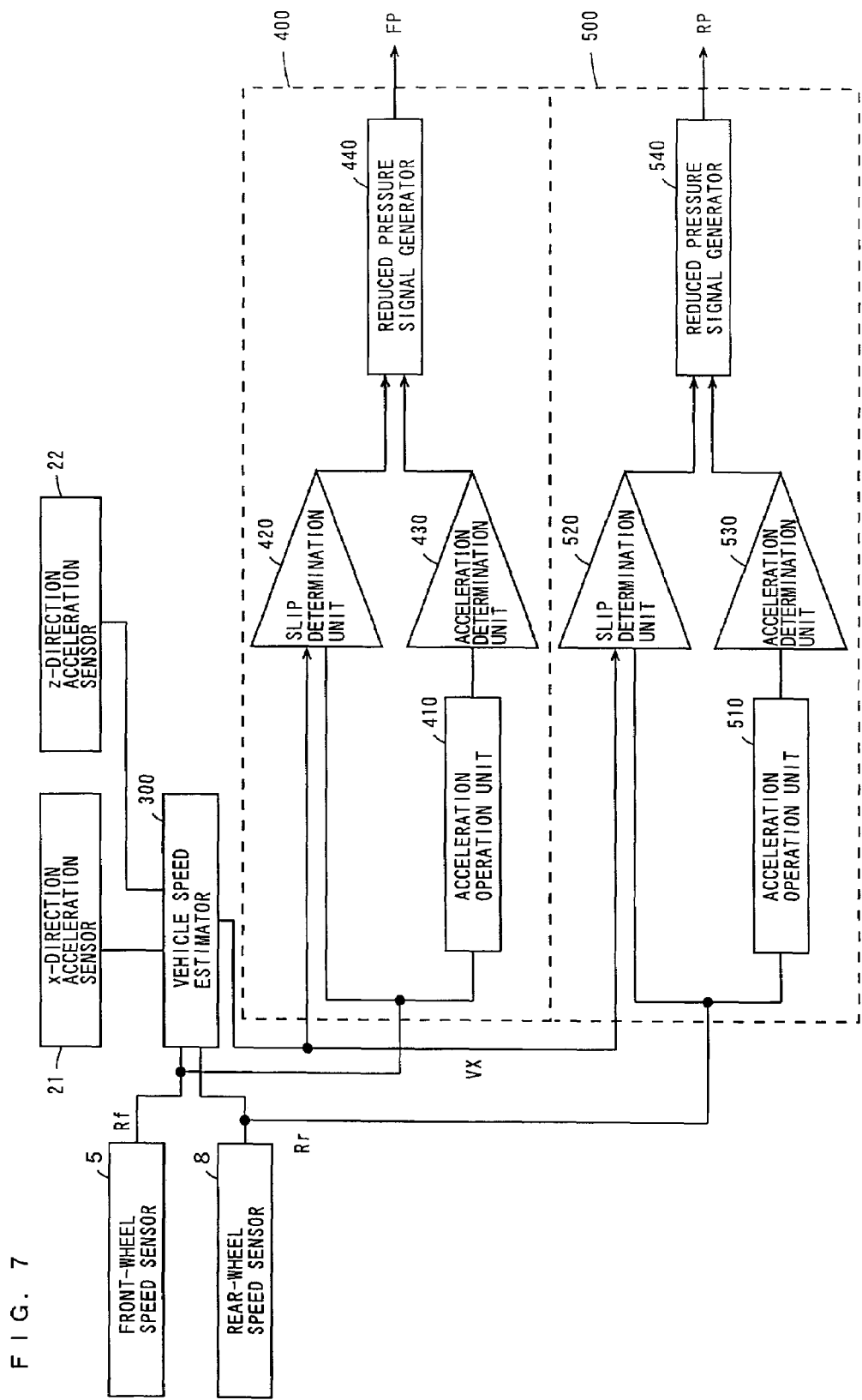
FIG. 7 is a block diagram showing the configuration of an ABS signal processor.

FIG. 7 is a block diagram showing the configuration of an ABS signal processor.

The ABS signal processor shown in FIG. 7 includes the vehicle speed estimator 300, a first signal generator 400, and a second signal generator 500. The ABS signal processor shown in FIG. 7 is provided in the ECU 30 shown in FIGS. 2 and 3 with an associated program function.

The first signal generator 400 includes an acceleration operation unit 410, a slip determination unit 420, an acceleration determination unit 430, and a reduced pressure signal generator 440. The second signal generator 500 includes an acceleration operation unit 510, a slip determination unit 520, an acceleration determination unit 530, and a reduced pressure signal generator 540.

The front-wheel speed signal Rf is fed to the slip determination unit 420 in the first signal generator 400 from the front-wheel speed sensor 5, and the vehicle speed signal VX is fed thereto from the vehicle speed estimator 300. The front-wheel speed signal Rf is fed to the acceleration operation unit 410 from the front-wheel speed sensor 5.

The slip determination unit 420 determines whether or not the front wheel 2 is slipping depending on whether or not the difference between the vehicle speed calculated on the basis of the front-wheel speed signal Rf and the vehicle speed represented by the vehicle speed signal VX is larger than a predetermined reference value.

The acceleration operation unit 410 calculates the acceleration of the front wheel 2 on the basis of the front-wheel speed signal Rf. The acceleration determination unit 430 determines whether or not the front wheel 2 is returned from a slipping state depending on whether or not the acceleration calculated by the acceleration operation unit 410 is changed from negative to positive.

The reduced pressure signal generator 440 feeds a reduced pressure signal FP to the hydraulic unit 10 shown in FIG. 3 when the slip determination unit 420 determines that the front wheel 2 is slipping while releasing the reduced pressure signal FP when the acceleration determination unit 430 determines that the front wheel 2 is returned from a slipping state.

The rear-wheel speed signal Rr is fed to the slip determination unit 520 in the second signal generator 500 from the rear-wheel speed sensor 8, and the vehicle speed signal VX is fed thereto from the vehicle speed estimator 300. The rear-wheel speed signal Rr is fed to the acceleration operation unit 510 from the rear-wheel speed sensor 8.

The slip determination unit 520 determines whether or not the rear wheel 3 is slipping depending on whether or not the difference between the vehicle speed calculated on the basis of the rear-wheel speed signal Rr and the vehicle speed represented by the vehicle speed signal VX is larger than a predetermined reference value.

The acceleration operation unit 510 calculates the acceleration of the rear wheel 3 on the basis of the rear-wheel speed signal Rr. The acceleration determination unit 530 determines whether or not the rear wheel 3 is returned from a slipping state depending on whether or not the acceleration calculated by the acceleration operation unit 510 is changed from negative to positive.

The reduced pressure signal generator 540 feeds a reduced pressure signal RP to the hydraulic unit 10 shown in FIG. 3 when the slip determination unit 520 determines that the rear wheel 3 is slipping while releasing the reduced pressure signal RP when the acceleration determination unit 530 determines that the rear wheel 3 is returned from a slipping state.

(7) Estimation of Offset by Karman Filter 330 for Constant Speed

A method of estimating x-direction acceleration offset and z-direction acceleration offset by the Karman filter 330 will now be described.

Considering x-direction acceleration offset, z-direction acceleration offset, observed noise, and process noise, the following equation of a state is obtained (k is a step in discrete time).

Equation 3

$$\begin{bmatrix} V_x(k+1) \\ a_x(k+1) \\ \varepsilon_{offx}(k+1) \\ V_z(k+1) \\ a_z(k+1) \\ \varepsilon_{offz}(k+1) \end{bmatrix} = \begin{bmatrix} 1 & T & 0 & 0 & 0 & 0 \\ 0 & 1 & 0 & 0 & 0 & 0 \\ 0 & 0 & 1 & 0 & 0 & 0 \\ 0 & 0 & 0 & 1 & T & 0 \\ 0 & 0 & 0 & 0 & 1 & 0 \\ 0 & 0 & 0 & 0 & 0 & 1 \end{bmatrix} \begin{bmatrix} V_x(k) \\ a_x(k) \\ \varepsilon_{offx}(k) \\ V_z(k) \\ a_z(k) \\ \varepsilon_{offz}(k) \end{bmatrix} + \begin{bmatrix} v_{npx}(k) \\ a_{npx}(k) \\ \varepsilon_{npoffx}(k) \\ v_{npz}(k) \\ a_{npz}(k) \\ \varepsilon_{npoffz}(k) \end{bmatrix} + \begin{bmatrix} 0 \\ 0 \\ 0 \\ -9.8T \\ 0 \\ 0 \end{bmatrix} \quad (3)$$

An observation equation is expressed by the following equation:

Equation 4

$$\begin{bmatrix} V_{obx}(k) \\ G_{obx}(k) \\ V_{obz}(k) \\ G_{obz}(k) \end{bmatrix} = \begin{bmatrix} 1 & 0 & 0 & 0 & 0 & 0 \\ 0 & \cos\theta_p(k) & 1 & 0 & -\sin\theta_p(k) & 0 \\ 0 & 0 & 0 & 1 & 0 & 0 \\ 0 & \sin\theta_p(k) & 0 & 0 & \cos\theta_p(k) & 1 \end{bmatrix} \begin{bmatrix} V_x(k) \\ a_x(k) \\ \varepsilon_{offx}(k) \\ V_z(k) \\ a_z(k) \\ \varepsilon_{offz}(k) \end{bmatrix} + \begin{bmatrix} V_{nobx}(k) \\ G_{nobx}(k) \\ V_{nobz}(k) \\ G_{nobz}(k) \end{bmatrix} \quad (4)$$

Elements of the matrix in the foregoing equations (3) and (4) are shown in Table 1.

TABLE 1

| | | |
|---|---|---|
| $V_x$ (k) | X-direction Speed [m/s] | Ground Coordinate System |
| $V_z$ (k) | Z-direction Speed [m/s] | Ground Coordinate System |
| $V_{obx}$ (k) | X-direction Speed Observed Value [m/s] | Ground Coordinate System |
| $V_{obz}$ (k) | Z-direction Speed Observed Value [m/s] | Ground Coordinate System |
| $a_x$ (k) | X-direction Acceleration [m/s$^2$] | Ground Coordinate System |
| $a_z$ (k) | Z-direction Acceleration [m/s$^2$] | Ground Coordinate System |
| $G_{obx}$ (k) | x-direction Acceleration Observed Value [m/s$^2$] | Sensor Coordinate System |
| $G_{obz}$ (k) | z-direction Acceleration Observed Value [m/s$^2$] | Sensor Coordinate System |
| $\varepsilon_{offx}$ (k) | x-direction Acceleration Offset [m/s$^2$] | Sensor Coordinate System |
| $\varepsilon_{offz}$ (k) | z-direction Acceleration Offset [m/s$^2$] | Sensor Coordinate System |
| $\theta_p$ (k) | Pitch Angle of Sensor Coordinate System to Ground Coordinate System [rad] | |
| $V_{nobx}$ (k) | Observed Noise at X-direction Speed [m/s] | Ground Coordinate System |
| $V_{nobz}$ (k) | Observed Noise at Z-direction Speed [m/s] | Ground Coordinate System |
| $G_{nobx}$ (k) | Observed Noise at x-direction Acceleration [m/s$^2$] | Sensor Coordinate System |
| $G_{nobz}$ (k) | Observed Noise at z-direction Acceleration [m/s$^2$] | Sensor Coordinate System |
| $V_{npx}$ (k) | Process Noise at X-direction Speed [m/s] | Ground Coordinate System |
| $V_{npz}$ (k) | Process Noise at Z-direction Speed [m/s] | Ground Coordinate System |
| $a_{npx}$ (k) | Process Noise at X-direction Acceleration [m/s$^2$] | Ground Coordinate System |
| $a_{npz}$ (k) | Process Noise at Z-direction Acceleration [m/s$^2$] | Ground Coordinate System |
| $\varepsilon_{npoffx}$ (k) | Process Noise in X-direction Acceleration Offset [m/s$^2$] | Ground Coordinate System |
| $\varepsilon_{npoffz}$ (k) | Process Noise in Z-direction Acceleration Offset [m/s$^2$] | Ground Coordinate System |
| T | Sampling Period [s] | |

An X-direction speed observed value $V_{obx}$ (k) in the foregoing equation (4) is obtained by the front-wheel speed signal Rf fed from the front-wheel speed sensor 5 shown in FIG. 4. A Z-direction speed observed value $V_{obz}$ (k) is herein set to 0.0 m/s because it is considered to be almost zero when the motorcycle 100 is stopped and is traveling at a constant speed.

An x-direction acceleration observed value $G_{obx}$ (k) is obtained by the x-direction acceleration signal Ax from the x-direction acceleration sensor 21, and a z-direction acceleration observed value $G_{obz}$ (k) is obtained by the z-direction acceleration signal Az from the z-direction acceleration sensor 22.

Values that are actually and empirically valid are respectively set as the observed noise and the process noise. The observed noise and the process noise are adjusted by simulation on the basis of the values.

The left side of the foregoing equation (3) is a state vector $x_{k+1}$ in a step k+1. The state vector $x_{k+1}$ is expressed by the following equation:

Equation 5

$$x_{k+1} = \begin{bmatrix} V_x(k+1) \\ a_x(k+1) \\ \varepsilon_{offx}(k+1) \\ V_z(k+1) \\ a_z(k+1) \\ \varepsilon_{offz}(k+1) \end{bmatrix} \quad (5)$$

The first term on the right side of the foregoing equation (3) is the product of a coefficient vector A and a state vector $x_k$ in a step k. The coefficient vector A and the state vector $x_k$ are expressed by the following equations:

Equation 6

$$A = \begin{bmatrix} 1 & T & 0 & 0 & 0 & 0 \\ 0 & 1 & 0 & 0 & 0 & 0 \\ 0 & 0 & 1 & 0 & 0 & 0 \\ 0 & 0 & 0 & 1 & T & 0 \\ 0 & 0 & 0 & 0 & 1 & 0 \\ 0 & 0 & 0 & 0 & 0 & 1 \end{bmatrix} \quad (6)$$

Equation 7

$$x_k = \begin{bmatrix} V_x(k) \\ a_x(k) \\ \varepsilon_{offx}(k) \\ V_z(k) \\ a_z(k) \\ \varepsilon_{offz}(k) \end{bmatrix} \quad (7)$$

The second term on the right side of the foregoing equation (3) is a process noise vector $w_k$ in the step k. The process noise vector $w_k$ is expressed by the following equation:

Equation 8

$$w_k = \begin{bmatrix} V_{npx}(k) \\ a_{npx}(k) \\ \varepsilon_{npoffx}(k) \\ V_{npz}(k) \\ a_{npz}(k) \\ \varepsilon_{npoffz}(k) \end{bmatrix} \quad (8)$$

The third term on the right side of the foregoing equation (3) is an external force vector $u_k$ in the step k. The external force vector $u_k$ is expressed by the following equation:

Equation 9

$$u_k = \begin{bmatrix} 0 \\ 0 \\ 0 \\ -9.8T \\ 0 \\ 0 \end{bmatrix} \quad (9)$$

The left side of the foregoing equation (4) is an observation vector $y_k$ in the step k. The observation vector $y_k$ is expressed by the following equation:

Equation 10

$$y_k = \begin{bmatrix} V_{obx}(k) \\ G_{obx}(k) \\ V_{obz}(k) \\ G_{obz}(k) \end{bmatrix} \quad (10)$$

The first term on the right side of the foregoing equation (4) is the product of a coefficient vector B and the state vector $x_k$ in the step k. The coefficient vector B is expressed by the following equation:

Equation 11

$$B = \begin{bmatrix} 1 & 0 & 0 & 0 & 0 & 0 \\ 0 & \cos\theta_p(k) & 1 & 0 & -\sin\theta_p(k) & 0 \\ 0 & 0 & 0 & 1 & 0 & 0 \\ 0 & \sin\theta_p(k) & 0 & 0 & \cos\theta_p(k) & 1 \end{bmatrix} \quad (11)$$

The second term on the right side of the foregoing equation (4) is an observed noise vector $v_k$ in the step k. The observed noise vector $v_k$ is expressed by the following equation:

Equation 12

$$v_k = \begin{bmatrix} V_{nobx}(k) \\ G_{nobx}(k) \\ V_{nobz}(k) \\ G_{nobz}(k) \end{bmatrix} \quad (12)$$

From the foregoing equations (5) to (9), the foregoing equation (3) is expressed by the following equation:

Equation 3a $$x_{k+1} = A \cdot x_k + w_k + u_k \quad (3a)$$

From the foregoing equations (10) to (12) and (7), the foregoing equation (4) is expressed by the following equation:

Equation 4a $$y_k = B \cdot x_k + v_k \quad (4a)$$

Here, the x-direction acceleration offset and the z-direction acceleration offset are estimated by sequential calculation using an extended Karman filter in the following manner with a pitch angle $\theta_P$ included in quantities of state (elements of a state vector).

A state vector $z_k$ in the step k, including the pitch angle $\theta_P$, is expressed by the following equation:

Equation 13

$$z_k = [x_k^T \theta_p(k)]^T = [V_x(k) a_x(k) \varepsilon_{offx}(k) V_z(k) a_z(k) \varepsilon_{offz}(k) \theta_p(k)]^T \quad (13)$$

A subscript T denotes a transported matrix. Further, a function $f_k(z_k)$ is expressed by the following equation:

Equation 14

$$f_k(z_k) = F_k z_k + [0\,0\,0\,-9.8T\,0\,0|0]^T \quad (14)$$

In the foregoing equation (14), a coefficient vector $F_k$ is expressed by the following equation:

Equation 15

$$F_k = \begin{bmatrix} 1 & T & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & T & 0 & 0 \\ 0 & 0 & 0 & 0 & 1 & 0 & 0 \\ 0 & 0 & 0 & 0 & 0 & 1 & 0 \\ 0 & A_{ax} & 0 & 0 & 0 & 0 & A_{\theta p} \end{bmatrix} \quad (15)$$

where, $0 \leq A_{ax} < 1$, $0 < A_{\theta p} \leq 1$

A constant $A_{ax}$ is zero, for example, and a constant $A_{\theta P}$ is 1, for example. Here, letting $z_{Ek|k}$ be an estimated value of the state vector $z_k$ in the step k, letting $z_{Ek|k-1}$ be an estimated value of a state vector $z_k$ in a step k−1, and letting $z_{Ek+1|k}$ be an estimated value of a state vector $Z_{k+1}$ in a step k, a filter equation is expressed by the following equations:

Equation 16

$$z_{Ek|k} = z_{Ek|k-1} + K_k(y_k - h_k(z_{Ek|k-1})) \quad (16)$$

Equation 17

$$z_{Ek+1|k} = f_k(z_{Ek|k}) \quad (17)$$

In the foregoing equation (16), $K_k$ denotes a Karman gain, and the observation vector $y_k$ is expressed by the foregoing equation (10). A function $h_k(z_{Ek|k-1})$ will be described later.

The Karman gain $K_k$ is expressed by the following equation:

Equation 18

$$K_k = \Sigma_{k|k-1} H_k^T (H_k \Sigma_{k|k-1} H_k^T + \Sigma_{vk})^{-1} \quad (18)$$

In the foregoing equation (18), $\Sigma_{k|k-1}$ denotes a covariance matrix of an estimated error in the state vector $z_k$ in the step k−1, and $\Sigma_{vk}$ denotes a covariance matrix in the observed noise vector $v_k$. A matrix $H_k$ will be described later.

A covariance matrix $\Sigma_{k|k}$ of an estimated error in the state vector $z_k$ is expressed by the following equation:

Equation 19

$$\Sigma_{k|k} = \Sigma_{k|k-1} - K_k H_k \Sigma_{k|k-1} \quad (19)$$

A covariance matrix equation of the error is expressed by the following equation:

Equation 20

$$\Sigma_{k+1|k} = F_k \Sigma_{k|k} F_k^T + G_k \Sigma_{wk} G_k^T \quad (20)$$

A matrix $G_k$ will be described later. The matrix $H_k$ in the foregoing equations (18) and (19) is expressed by the following equation:

Equation 21

$$H_k = \begin{bmatrix} 1 & 0 & 0 & 0 & 0 & 0 \\ 0 & \cos\theta_p(k) & 1 & 0 & -\sin\theta_p(k) & 0 \\ 0 & 0 & 0 & 1 & 0 & 0 \\ 0 & \sin\theta_p(k) & 0 & 0 & \cos\theta_p(k) & 1 \end{bmatrix} \begin{bmatrix} 0 \\ -a_x \sin\theta_p(k) - a_z \cos\theta_p(k) \\ 0 \\ a_x \cos\theta_p(k) - a_z \sin\theta_p(k) \end{bmatrix} \quad (21)$$

The function $h_k(z_{Ek|k-1})$ in the foregoing equation (16) is expressed by the following equation:

Equation 22

$$h_k(z_{Ek|k-1}) = c_k(\theta_{pEk|k-1}) x_{Ek|k-1} \quad (22)$$

In the foregoing equation (22), $x_{Ek|k-1}$ denotes an estimated value of the state vector $x_k$ in the step k−1. $\theta_{pEk|k-1}$ denotes an estimated value of a pitch angle $\theta_P(k)$ in the step k−1. A matrix $C_k$ is expressed by the following equation:

Equation 23

$$C_k = \begin{bmatrix} 1 & 0 & 0 & 0 & 0 & 0 \\ 0 & \cos\theta_p(k) & 1 & 0 & -\sin\theta_p(k) & 0 \\ 0 & 0 & 0 & 1 & 0 & 0 \\ 0 & \sin\theta_p(k) & 0 & 0 & \cos\theta_p(k) & 1 \end{bmatrix} \quad (23)$$

A matrix $G_k$ in the foregoing equation (20) is expressed by the following equation:

Equation 24

$$G_k = \begin{bmatrix} I \\ 0 \end{bmatrix} \quad (24)$$

In the foregoing equation (24), I denotes a unit matrix.

The extended Karman filter allows the pitch angle $\theta_P(k)$, together with x-direction acceleration offset $\epsilon_{offx}(k)$ and z-direction acceleration offset $\epsilon_{offz}(k)$ at the time when the motorcycle 100 is stopped and is traveling at a constant speed, to be estimated.

(8) Simulation of Karman Filter 330 for Constant Speed

Here, the Karman filter 330 was simulated to estimate the x-direction acceleration offset and the z-direction acceleration offset.

Figure 8:
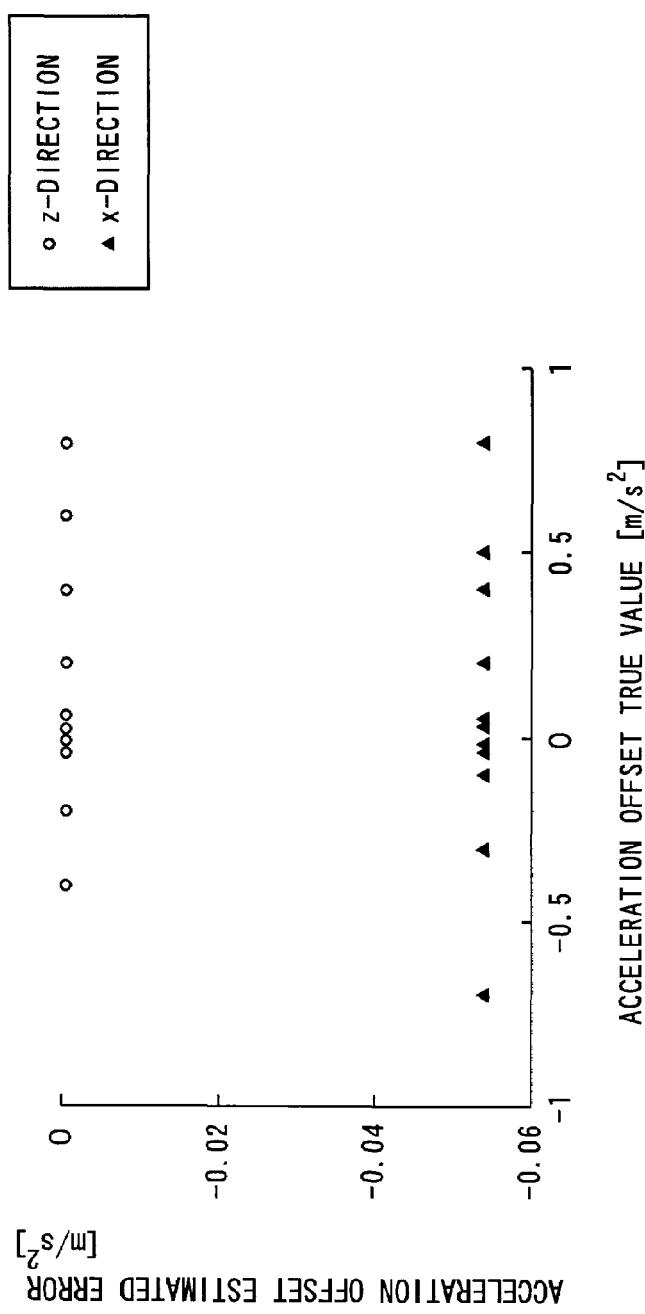
FIG. 8 is a diagram showing the relationship between an acceleration offset true value and an acceleration offset estimated error.

FIG. 8 is a diagram showing the relationship between an acceleration offset true value and an acceleration offset estimated error.

In FIG. 8, the horizontal axis represents respective true values of the x-direction acceleration offset and the z-direction acceleration offset, and the vertical axis represents an estimated error of the acceleration offset. The estimated error of the acceleration offset is a difference between an estimated value of the x-direction acceleration offset and the true value of the x-direction acceleration offset and a difference between an estimated value of the z-direction acceleration offset and the true value of the z-direction acceleration offset.

In FIG. 8, the estimated error of the z-direction acceleration offset is indicated by a white circle, and the estimated error of the x-direction acceleration offset is indicated by a black triangle. As shown in FIG. 8, the estimated error of the x-direction acceleration offset is within about 0.06 m/s$^2$, and the estimated error of the z-direction acceleration offset is within about 0.001 m/s$^2$.

Figure 9:
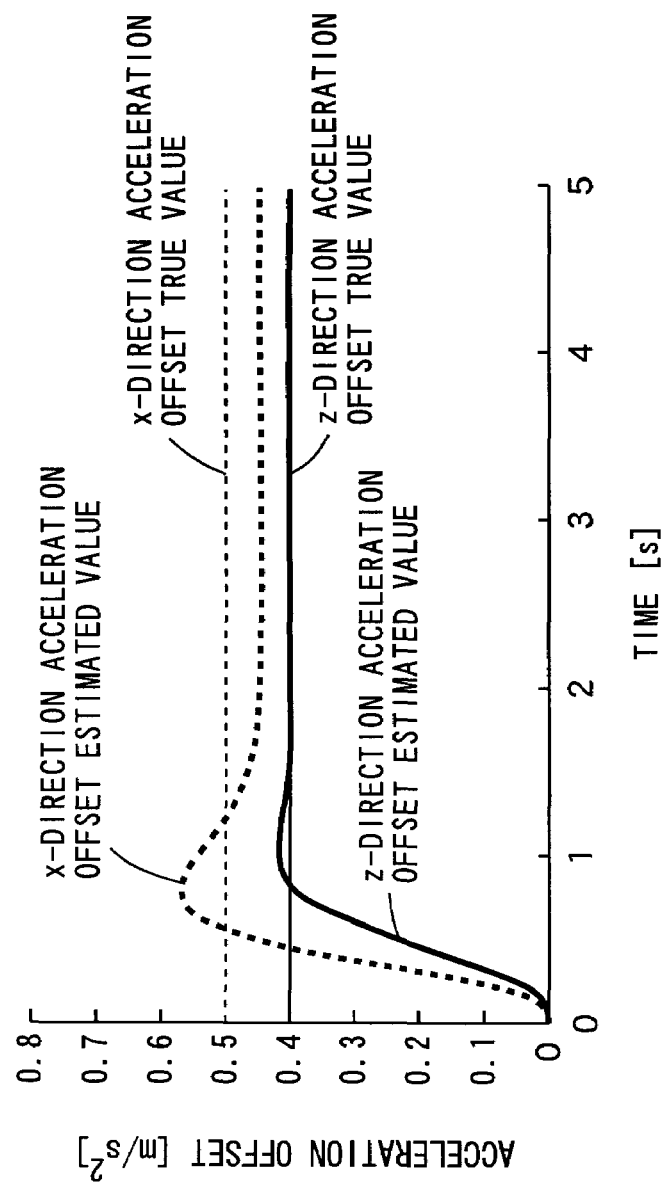
FIG. 9 is a diagram showing the change with time of an acceleration offset estimated value in the process of estimating acceleration offset.

FIG. 9 is a diagram showing the change with time of an acceleration offset estimated value in the process of estimating the acceleration offset.

In FIG. 9, the horizontal axis represents time, and the vertical axis represents acceleration offset. In FIG. 9, the true value of the z-direction acceleration offset is indicated by a thin solid line, the estimated value of the z-direction acceleration offset is indicated by a thick solid line, the true value of the x-direction acceleration offset is indicated by a thin dotted line, and the estimated value of the x-direction acceleration offset is indicated by a thick dotted line.

As shown in FIG. 9, both the estimated value of the x-direction acceleration offset and the estimated value of the z-direction acceleration offset are completely converged in two seconds. This allows the x-direction acceleration offset and the z-direction acceleration offset to be estimated if a constant speed state for two or more seconds exists.

(9) Estimation of Pitch Angle by Karman Filter 340 for Acceleration/Deceleration A method of estimating a pitch angle by the Karman filter 340 will now be described.

Considering observed noise and process noise, the following equation of state is obtained (k is a step in discrete time).

Equation 25

$$\begin{bmatrix} a_x(k+1) \\ a_z(k+1) \end{bmatrix} = \begin{bmatrix} 1 & 0 \\ 0 & 1 \end{bmatrix} \begin{bmatrix} a_x(k) \\ a_z(k) \end{bmatrix} + \begin{bmatrix} a_{npx}(k) \\ a_{npz}(k) \end{bmatrix} \quad (25)$$

An observation equation is expressed by the following equation.

Equation 26

$$\begin{bmatrix} G_{Aobx}(k) \\ G_{Aobz}(k) \end{bmatrix} = \begin{bmatrix} \cos\theta_p(k) & -\sin\theta_p(k) \\ \sin\theta_p(k) & \cos\theta_p(k) \end{bmatrix} \begin{bmatrix} a_x(k) \\ a_z(k) \end{bmatrix} + \begin{bmatrix} G_{nobx}(k) \\ G_{nobz}(k) \end{bmatrix} \quad (26)$$

Elements of the matrix in the foregoing equations (25) and (26) are shown in Table 2.

TABLE 2

| | | |
|---|---|---|
| $a_x$ (k) | X-direction Acceleration [m/s²] | Ground Coordinate System |
| $a_z$ (k) | Z-direction Acceleration [m/s²] | Ground Coordinate System |
| $G_{Aobx}$ (k) | x-direction Acceleration Corrected Value [m/s²] | Sensor Coordinate System |
| $G_{Aobz}$ (k) | z-direction Acceleration Corrected Value [m/s²] | Sensor Coordinate System |
| $\theta_P$ (k) | Pitch Angle of Sensor Coordinate System to Ground Coordinate System [rad] | |
| $G_{nobx}$ (k) | Observed Noise at x-direction Acceleration [m/s²] | Sensor Coordinate System |
| $G_{nobz}$ (k) | Observed Noise at z-direction Acceleration [m/s²] | Sensor Coordinate System |
| $a_{npx}$ (k) | Process Noise at X-direction Acceleration [m/s²] | Ground Coordinate System |
| $a_{npz}$ (k) | Process Noise at Z-direction Acceleration [m/s²] | Ground Coordinate System |

Here, an x-direction acceleration corrected value $G_{Aobx}$ (k) is an x-direction acceleration corrected by the offset corrector 360 shown in FIG. 4, and is a value obtained by subtracting the x-direction acceleration offset $\epsilon_{offx}$ (k) from the x-direction acceleration observed value $G_{obx}$ (k). Further, a z-direction acceleration corrected value $G_{AobZ}$ (k) is a z-direction acceleration corrected by the offset corrector 360 shown in FIG. 4, and is a value obtained by subtracting the z-direction acceleration offset $\epsilon_{offz}$ (k) from the z-direction acceleration observed value $G_{obz}$ (k).

Values that are actually and empirically valid are respectively set as the observed noise and the process noise. The observed noise and the process noise are adjusted by simulation on the basis of the values.

The left side of the foregoing equation (25) is a state vector $X_{k+1}$ in a step k+1. The state vector $X_{k+1}$ is expressed by the following equation:

Equation 27

$$x_{k+1} = \begin{bmatrix} a_x(k+1) \\ a_z(k+1) \end{bmatrix} \quad (27)$$

The first term on the right side of the foregoing equation (25) is the product of a coefficient vector A and a state vector $x_k$ in a step k. The coefficient vector A and the state vector $x_k$ are expressed by the following equations:

Equation 28

$$A = \begin{bmatrix} 1 & 0 \\ 0 & 1 \end{bmatrix} \quad (28)$$

Equation 29

$$x_k = \begin{bmatrix} a_x(k) \\ a_z(k) \end{bmatrix} \quad (29)$$

The second term on the right side of the foregoing equation (25) is a process noise vector $w_k$ in the step k. The process noise vector $w_k$ is expressed by the following equation:

Equation 30

$$w_k = \begin{bmatrix} a_{npx}(k) \\ a_{npz}(k) \end{bmatrix} \quad (30)$$

The left side of the foregoing equation (26) is an observation vector $y_k$ in the step k. The observation vector $y_k$ is expressed by the following equation:

Equation 31

$$y_k = \begin{bmatrix} G_{Aobx}(k) \\ G_{Aobz}(k) \end{bmatrix} \quad (31)$$

The first term on the right side of the foregoing equation (26) is the product of a coefficient vector B and the state vector $x_k$ in the step k. The coefficient vector B is expressed by the following equation:

Equation 32

$$B = \begin{bmatrix} \cos\theta_p(k) & -\sin\theta_p(k) \\ \sin\theta_p(k) & \cos\theta_p(k) \end{bmatrix} \quad (32)$$

The second term on the right side of the foregoing equation (26) is an observed noise vector $v_k$ in the step k. The observed noise vector $v_k$ is expressed by the following equation:

Equation 33

$$v_k = \begin{bmatrix} G_{nobx}(k) \\ G_{nobz}(k) \end{bmatrix} \quad (33)$$

From the foregoing equations (27) to (30), the foregoing equation (25) is expressed by the following equation:

Equation 25a $$x_{k+1} = A \cdot x_k + w_k \quad (25a)$$

From the foregoing equations (31) to (33) and (29), the foregoing equation (26) is expressed by the following equation:

Equation 26a $$y_k = B \cdot x_k + v_k \quad (26a)$$

Here, a pitch angle $\theta_P$ is estimated using an extended Karman filter in the following manner with the pitch angle $\theta_P$ included in quantities of state (elements of a state vector).

A state vector $z_k$ in the step k, including the pitch angle $\theta_P$, is expressed by the following equation:

Equation 34

$$z_k = [x_k^T \theta_p(k)]^T = [a_x(k) a_z(k) \theta_p(k)]^T \quad (34)$$

A subscript T denotes a transported matrix. Further, a function $f_k(z_k)$ is expressed by the following equation:

Equation 35

$$f_k(z_k) = F_k z_k \quad (35)$$

In the foregoing equation (35), a coefficient vector $F_k$ is expressed by the following equation:

Equation 36

$$F_k = \begin{bmatrix} 1 & 0 & 0 \\ 0 & 1 & 0 \\ A_{ax} & 0 & A_{\theta p} \end{bmatrix} \text{ where, } 0 \le A_{ax} < 1, 0 < A_{\theta p} \le 1 \quad (36)$$

A constant $A_{ax}$ is zero, for example, and a constant $A_{\theta P}$ is 1, for example. Here, letting $z_{Ek|k}$ be an estimated value of the state vector $z_k$ in the step k, letting $z_{Ek|k-1}$ be an estimated value of a state vector $z_k$ in a step k−1, and letting $z_{Ek+1|k}$ be an estimated value of a state vector $z_{k+1}$ in a step k, a filter equation is expressed by the following equations:

Equation 37

$$z_{Ek|k} = z_{Ek|k-1} + K_k(y_k - h_k(z_{Ek|k})) \quad (37)$$

Equation 38

$$z_{Ek+1|k} = f_k(z_{Ek|k}) \quad (38)$$

In the foregoing equation (37), $K_k$ denotes a Karman gain, and the observation vector $y_k$ is expressed by the foregoing equation (31). A function $h_k(z_{Ek|k-1})$ will be described later.

The Karman gain $K_k$ is expressed by the following equation.

Equation 39

$$K_k = \Sigma_{k|k-1} H_k^T (H_k \Sigma_{k|k-1} H_k^T + \Sigma_{vk})^{-1} \quad (39)$$

In the foregoing equation (39), $\Sigma_{k|k-1}$ denotes a covariance matrix of an estimated error in the state vector $z_k$ in the step k−1, and $\Sigma_{vk}$ denotes a covariance matrix in the observed noise vector $v_k$. A matrix $H_k$ will be described later.

A covariance matrix $\Sigma_{k|k}$ of the estimated error in the state vector $z_k$ is expressed by the following equation:

Equation 40

$$\Sigma_{k|k} = \Sigma_{k|k-1} - K_k H_k \Sigma_{k|k-1} \quad (40)$$

A covariance matrix equation of the error is expressed by the following equation:

Equation 41

$$\Sigma_{k+1|k} = F_k \Sigma_{k|k} F_k^T + G_k \Sigma_{wk} G_k^T \quad (41)$$

A matrix $G_k$ will be described later. The matrix $H_k$ is expressed by the following equation:

Equation 42

$$H_k = \begin{bmatrix} \cos\theta_p(k) & -\sin\theta_p(k) & -a_x\sin\theta_p(k) & -a_z\cos\theta_p(k) \\ \sin\theta_p(k) & \cos\theta_p(k) & a_x\cos\theta_p(k) & -a_z\sin\theta_p(k) \end{bmatrix} \quad (42)$$

The function $h_k(z_{Ek|k-1})$ in the foregoing equation (37) is expressed by the following equation:

Equation 43

$$h_k(z_{Ek|k-1}) = c_k(\theta_{pEk|k-1}) x_{Ek|k-1} \quad (43)$$

In the foregoing equation (43), $x_{Ek|k-1}$ denotes an estimated value of the state vector $x_k$ in the step k−1. $\theta_{pEk|k-1}$ denotes an estimated value of a pitch angle $\theta_P(k)$ in the step k−1. A matrix $C_k$ is expressed by the following equation:

Equation 44

$$C_k = \begin{bmatrix} \cos\theta_p(k) & -\sin\theta_p(k) \\ \sin\theta_p(k) & \cos\theta_p(k) \end{bmatrix} \quad (44)$$

The matrix $G_k$ in the foregoing equation (41) is expressed by the following equation:

Equation 45

$$G_k = \begin{bmatrix} I \\ 0 \end{bmatrix} \quad (45)$$

In the foregoing equation (45), I denotes a unit matrix.

The extended Karman filter allows the pitch angle $\theta_P(k)$ at the time when the motorcycle 100 is accelerated and decelerated to be estimated.

(10) Correction of Acceleration by Acceleration Corrector 370

The acceleration corrector 370 corrects the x-direction acceleration and the z-direction acceleration by the following equation using a pitch angle estimated value obtained by the Karman filter 340 for acceleration/deceleration. Thus, an X-direction acceleration estimated value and a Z-direction acceleration estimated value are obtained.

Equation 46

$$\begin{bmatrix} a_{Ex} \\ a_{Ez} \end{bmatrix} = \begin{bmatrix} \cos\theta_{Ep} & \sin\theta_{Ep} \\ -\sin\theta_{Ep} & \cos\theta_{Ep} \end{bmatrix} \begin{bmatrix} G_{Aobx}(k) \\ G_{Aobz}(k) \end{bmatrix} \quad (46)$$

Elements of the matrix in the forgoing equation (46) are shown in Table 3.

TABLE 3

| | | |
|---|---|---|
| $a_{Ex}(k)$ | X-direction Acceleration Estimated Value [m/s²] | Ground Coordinate System |
| $a_{Ez}(k)$ | Z-direction Acceleration Estimated Value [m/s²] | Ground Coordinate System |
| $G_{Aobx}(k)$ | x-direction Acceleration Corrected Value [m/s²] | Sensor Coordinate System |
| $G_{Aobz}(k)$ | z-direction Acceleration Corrected Value [m/s²] | Sensor Coordinate System |
| $\theta_{Ep}(k)$ | Estimated Value of Pitch Angle of Sensor Coordinate System to Ground Coordinate System [rad] | |

Here, an x-direction acceleration corrected value $G_{Aobx}(k)$ is an x-direction acceleration corrected by the offset corrector 360 shown in FIG. 4, and is a value obtained by subtracting the x-direction acceleration offset $\epsilon_{offx}(k)$ from the x-direction acceleration observed value $G_{obx}(k)$. Further, a z-direction acceleration corrected value $G_{Aobz}(k)$ is a z-direction acceleration corrected by the offset corrector 360 shown in FIG. 4, and is a value obtained by subtracting the z-direction acceleration offset $\epsilon_{offz}(k)$ from the z-direction acceleration observed value $G_{obz}(k)$.

The foregoing equation (46) allows an x-direction acceleration estimated value $a_{Ex}$ and a Z-direction acceleration estimated value $a_{Ez}$ at the time when the motorcycle 100 is accelerated and decelerated to be calculated.

(11) Simulation of Karman Filter 340 for Acceleration/Deceleration

Here, the Karman filter 340 and the acceleration corrector 370 were simulated to estimate the X-direction acceleration and the Z-direction acceleration.

Figure 10:
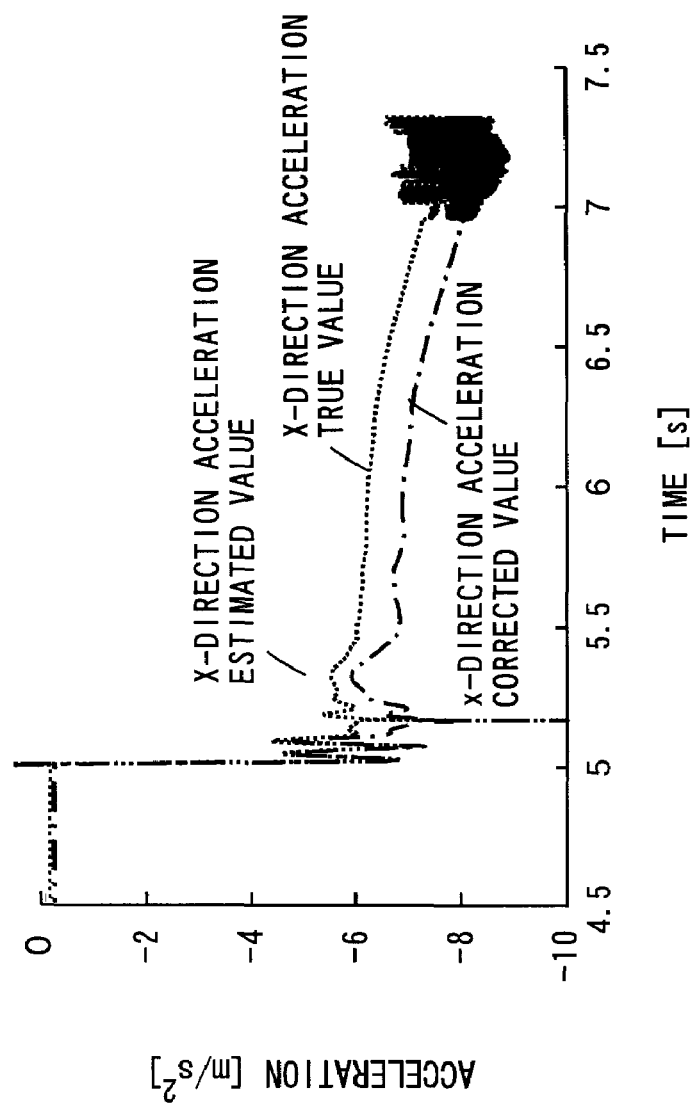
FIG. 10 is a diagram showing the results of estimation of X-direction acceleration.

FIG. 10 is a diagram showing the results of the estimation of the X-direction acceleration.

In FIG. 10, the horizontal axis represents time, and the vertical axis represents acceleration. In FIG. 10, a true value of the X-direction acceleration is indicated by a dotted line, the X-direction acceleration estimated value $a_{Ex}$ obtained by the acceleration corrector 370 using a pitch angle estimated value $\theta_{Ep}$ obtained by the Karman filter 340 is indicated by a solid line, and an x-direction acceleration corrected value $G_{Aobx}(k)$ obtained by the offset corrector 360 is indicated by a one-dot and dash line. The x-direction acceleration corrected value $G_{Aobx}(k)$ is affected by a pitch angle, although the effect of the x-direction acceleration offset is removed therefrom.

As shown in FIG. 10, the X-direction acceleration estimated value $a_{EX}$ is closer to the true value of the X-direction acceleration, as compared with the x-direction acceleration corrected value $G_{Aobx}(k)$.

Furthermore, the true value of the X-direction acceleration, the X-direction acceleration estimated value $a_{EX}$, and the x-direction acceleration corrected value $G_{Aobx}(k)$ were integrated over time to estimate a vehicle speed.

Figure 11:
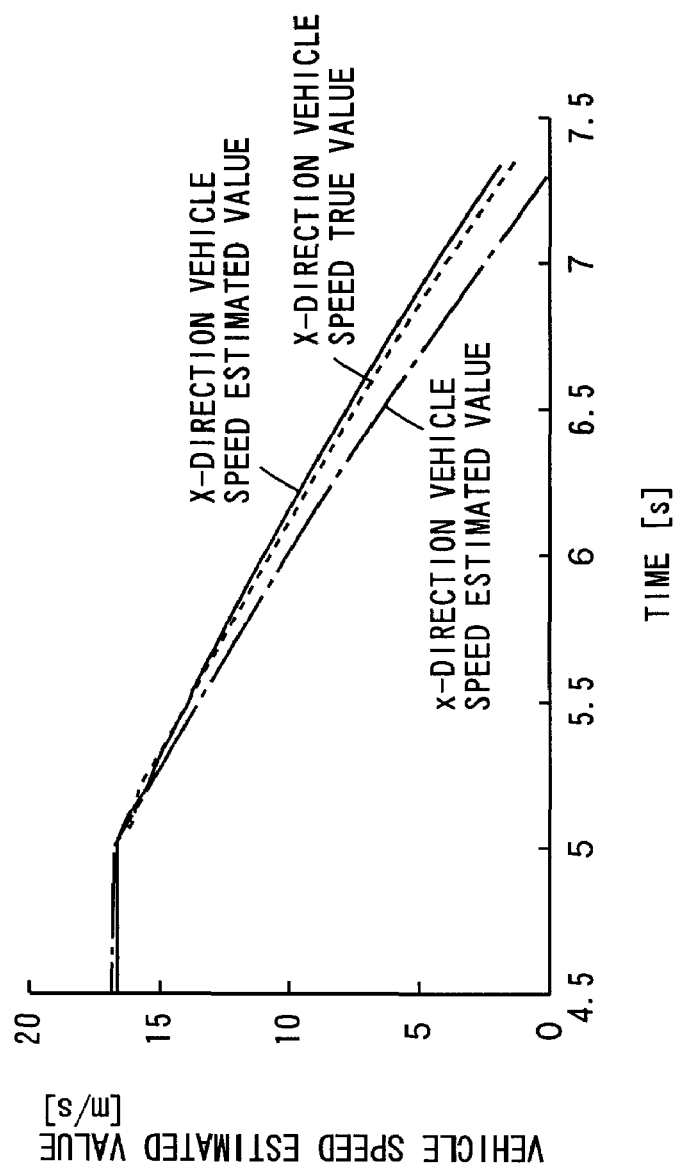
FIG. 11 is a diagram showing the results of estimation of a vehicle speed.

FIG. 11 is a diagram showing the results of the estimation of the vehicle speed. In FIG. 11, the horizontal axis represents time, and the vertical axis represents a vehicle speed estimated value.

In FIG. 11, a vehicle speed calculated using the true value of the X-direction acceleration (an X-direction vehicle speed true value) is indicated by a dotted line, an X-direction vehicle speed estimated value calculated using the X-direction acceleration estimated value $a_{Ex}$ is indicated by a solid line, and an x-direction vehicle speed estimated value calculated using the x-direction acceleration corrected value $G_{Aobx}(k)$ is indicated by a one-dot and dash line.

As shown in FIG. 11, the X-direction vehicle speed estimated value calculated using the X-direction acceleration estimated value $a_{Ex}$ is closer to the X-direction vehicle speed true value, as compared with the x-direction vehicle speed estimated value calculated using the x-direction acceleration corrected value $G_{Aobx}(k)$.

(12) Effects of the Preferred Embodiments

In the motorcycle 100 according to the present preferred embodiment, the offset in the x-direction acceleration sensor 21 and the offset in the z-direction acceleration sensor 22 are estimated with high accuracy by the Karman filter 330 for a constant speed in the vehicle speed estimator 300 when the motorcycle 100 is stopped and is traveling at a constant speed. Even when the detected value in the x-direction acceleration sensor 21 and the detected value in the z-direction acceleration sensor 22 are affected by gravity due to pitching having an arbitrary frequency, it is possible to accurately estimate the offset in the x-direction acceleration sensor 21 and the offset in the z-direction acceleration sensor 22.

An observed disturbance given to the x-direction acceleration sensor 21 and the z-direction acceleration sensor 22 are removed in the Karman filter 330. This prevents the ABS controlled by the vehicle speed in the X-direction obtained by the vehicle speed estimator 300 from being unstable due to the observed disturbance.

The estimated value of the offset in the x-direction acceleration sensor 21 and the estimated value of the offset in the z-direction acceleration sensor 22 that are obtained when the motorcycle 100 is stopped or is traveling at a constant speed are stored in the offset storage 350, while the detected value in the x-direction acceleration sensor 21 and the detected value in the z-direction acceleration sensor 22 are corrected by the offset corrector 360 on the basis of the estimated value of the offset in the x-direction acceleration sensor 21 and the estimated value of the offset in the z-direction acceleration sensor 22 that are stored in the offset storage 350 when the motorcycle 100 is accelerated or decelerated. This allows the x-direction acceleration and the z-direction acceleration of the motorcycle 100 to be detected with high accuracy.

The pitch angle of the vehicle body 1 is estimated by the Karman filter 340 for acceleration/deceleration when motorcycle 100 is accelerated or decelerated. This allows the pitch angle due to pitching having an arbitrary frequency to be estimated at low cost and with high accuracy without using a high-cost gyro sensor.

Furthermore, the X-direction acceleration and the Y-direction acceleration of the motorcycle 100 are calculated by the acceleration corrector 370 on the basis of the estimated value of the pitch angle, the detected value in the x-direction acceleration sensor 21, and the detected value in the z-direction acceleration sensor 22. This allows the X-direction acceleration of the motorcycle 100 to be detected with high accuracy.

The vehicle speed operation unit 380 obtains the vehicle speed in the X-direction from the X-direction acceleration with high accuracy. When both the front wheel 2 and the rear wheel 3 are braked, therefore, it is possible to detect the sliding of the front wheel 2 and the rear wheel 3 as well as to detect the vehicle speed with high accuracy.

In cases where both the front wheel 2 and the rear wheel 3 slide, for example, a case where the front wheel 2 is braked during the driving of the rear wheel 3, the speed at the center of gravity of the vehicle body 1 cannot be found from the respective wheel speeds of the front wheel 2 and the rear wheel 3. Even in such a case, it is possible to detect the sliding of the front wheel 2 and the rear wheel 3 using the vehicle speed estimator 300 in the present preferred embodiment as well as to detect the vehicle speed with high accuracy.

(13) Other Preferred Embodiments

Although in the preferred embodiments described above, description was made of a case where the acceleration estimation device is applied to the ABS, the present invention is not limited to this. For example, the acceleration estimation device may be applied to another brake control system, a traction control system, or a cruise control system. The traction control system refers to a system for obtaining a driving force most suitable for the time of turning, the time of starting, or the time of acceleration by controlling a driving force of a driving wheel or an output of the engine and a braking force. The cruise control system refers to a system for automatically controlling a vehicle speed to be constant in the case of long-distance or long-term traveling.

The acceleration estimation device is also applicable to drivability control by an electronic throttle. The drivability control refers to the control for obtaining a comfortable driving performance. When the acceleration estimation device is applied to the drivability control, an error of an acceleration sensor can be reduced. Therefore, the comfortable driving performance can be controlled with high accuracy. As a result, it is possible to provide smooth acceleration characteristics that do not make a driver feel changes and variations in acceleration.

Moreover, the acceleration estimation device of the present invention can be utilized for estimating the acceleration of a vehicle when a GPS (Global Positioning System) signal cannot be received in a navigation system.

Although in the preferred embodiments described above, each of the constituent elements within the vehicle speed estimator 300 is preferably provided by the ECU 30 and associated program function, the present invention is not limited to this. For example, parts or all of the plurality of constituent elements within the vehicle speed estimator 300 may be provided by hardware such as an electronic circuit.

Although in the preferred embodiments described above, the offset estimator preferably includes the Karman filter 330 for a constant speed composed of an extended Karman filter, the present invention is not limited to this. For example, the offset estimator may be achieved by another adaptive filtering method. For example, an LMS (Least Mean Square) adaptive filter or H filtering may be used.

Although in the preferred embodiments described above, the pitch angle estimator preferably includes the Karman filter 340 for acceleration/deceleration composed of an extended Karman filter, the present invention is not limited to this. For example, the pitch angle estimator may be achieved by another adaptive filtering method. For example, an LMS adaptive filter or H filtering may be used.

The vehicle speed estimator 300 in the preferred embodiments described above is not limited to the motorcycle 100. For example, it can be applied to various types of vehicles such as motorcycles, four-wheeled vehicles, and three-wheeled vehicles, or any other suitable vehicle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An acceleration estimation device for estimating acceleration of a vehicle, comprising:
   a first acceleration sensor arranged to detect an acceleration in a forward-and-backward direction of the vehicle;
   a second acceleration sensor arranged to detect an acceleration in an up-and-down direction of the vehicle;
   a wheel speed detector arranged to detect a wheel speed of the vehicle;
   an offset estimator arranged to estimate offset in the first acceleration sensor and offset in the second acceleration sensor using a relationship among a detected value in the first acceleration sensor, a detected value in the second acceleration sensor, and a detected value in the wheel speed detector when the vehicle is at a substantially constant speed; and
   a corrector arranged to correct the detected value in the first acceleration sensor and the detected value in the second acceleration sensor on the basis of an estimated value of the offset in the first acceleration sensor and an estimated value of the offset in the second acceleration sensor that are obtained by the offset estimator when the vehicle is accelerated or decelerated.

2. The acceleration estimation device according to claim 1, wherein the offset estimator includes:
   a first Karman filter arranged to estimate the offset in the first acceleration sensor and the offset in the second acceleration sensor using a relationship among the acceleration in a traveling direction of the vehicle that is substantially perpendicular to a direction of gravity, the acceleration in a vertical direction parallel to the direction of gravity, the detected value in the first acceleration sensor, the detected value in the second acceleration sensor, a speed in the traveling direction, a speed in the vertical direction, the speed of the vehicle obtained from the detected value in the wheel speed detector, and a pitch angle of the vehicle.

3. The acceleration estimation device according to claim 1, further comprising:
   a pitch angle estimator arranged to estimate a pitch angle of the vehicle when the vehicle is accelerated or decelerated; and
   an acceleration calculator arranged to calculate an acceleration in a traveling direction of the vehicle that is perpendicular to the direction of gravity, and an acceleration in the vertical direction parallel to the direction of gravity on the basis of the detected value in the first acceleration sensor and the detected value in the second acceleration sensor that are corrected by the corrector and the pitch angle estimated by the pitch angle estimator.

4. The acceleration estimation device according to claim 3, further comprising a speed calculator arranged to integrate a calculated value of the acceleration in the traveling direction obtained by the acceleration calculator to calculate a speed in the traveling direction.

5. The acceleration estimation device according to claim 3, wherein the pitch angle estimator includes:
a second Karman filter arranged to estimate the pitch angle of the vehicle using a relationship among the detected value in the first acceleration sensor and the detected value in the second acceleration sensor that are corrected by the corrector, the acceleration in the traveling direction, the acceleration in the vertical direction, and the pitch angle of the vehicle.

6. The acceleration estimation device according to claim 1, wherein the offset estimator is arranged to determine that the vehicle is in a substantially constant speed state when a rate of change in the wheel speed detected by the wheel speed detector is not more than a predetermined threshold value.

7. A vehicle comprising:
a vehicle body;
a wheel provided on the vehicle body;
an acceleration estimation device arranged on the vehicle body; and
a controller; wherein
the acceleration estimation device includes:
a first acceleration sensor on the vehicle and arranged to detect an acceleration in a forward-and-backward direction of the vehicle,
a second acceleration sensor on the vehicle and arranged to detect an acceleration in an up-and-down direction of the vehicle;
a wheel speed detector arranged to detect a wheel speed of the vehicle;
an offset estimator arranged to estimate offset in the first acceleration sensor and offset in the second acceleration sensor using a relationship among a detected value in the first acceleration sensor, a detected value in the second acceleration sensor, and a detected value in the wheel speed detector when the vehicle is at a substantially constant speed; and
a corrector arranged to correct the detected value in the first acceleration sensor and the detected value in the second acceleration sensor on the basis of an estimated value of the offset in the first acceleration sensor and an estimated value of the offset in the second acceleration sensor that are obtained by the offset estimator when the vehicle is accelerated or decelerated; and
the controller controls the rotation of the wheel on the basis of at least one of the detected value in the first acceleration sensor and the detected value in the second acceleration sensor that are corrected by the acceleration estimation device.

* * * * *